United States Patent
Choi et al.

(10) Patent No.: US 11,546,910 B2
(45) Date of Patent: Jan. 3, 2023

(54) OPTIMIZATION OF RANGING SESSIONS INITIATED BY VEHICLE AND PEDESTRIAN UES

(71) Applicant: QUALCOMM Incorporated, San Diego, CA (US)

(72) Inventors: Chang-Sik Choi, Hillsborough, NJ (US); Dan Vassilovski, Del Mar, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/179,548

(22) Filed: Feb. 19, 2021

(65) Prior Publication Data
US 2022/0272687 A1    Aug. 25, 2022

(51) Int. Cl.
*H04W 72/00* (2009.01)
*H04W 72/04* (2009.01)
(Continued)

(52) U.S. Cl.
CPC .......... *H04W 72/048* (2013.01); *G01S 13/74* (2013.01); *H04W 4/023* (2013.01); *H04W 4/029* (2018.02);
(Continued)

(58) Field of Classification Search
CPC ... H04W 72/048; H04W 4/029; H04W 4/023; H04W 72/005; H04W 72/044; G01S 13/74
See application file for complete search history.

(56) References Cited

U.S. PATENT DOCUMENTS 11,082,809 B1 *   8/2021   Burowski ............. H04W 80/02
2020/0319329 A1  10/2020   Shahar-Doron et al.

OTHER PUBLICATIONS 802 11 Working Group of Lan/Wan Standard Committee of the IEEE Computer Society: IEEE Draft, Draft P802.11AZ_D1.0. IEEE-SA, Piscataway, NJ, USA, vol. 802.11 az drafts, No. D1.0, Feb. 5, 2019 (Feb. 5, 2019), pp. 1-187, XP068149543, Retrieved from the Internet: URL: www.ieee802.org/11/private/Draft_Standards/11az/Draft P802.11az_D1.0.pdf [Retrieved on Feb. 5, 2019] the whole document, sections 9.4.2.1, 9.4.2.167, pp. 33, 38-40, figures 9-87, 9-618, tables 9-281, sections 9.4.2.277-278, pp. 45-50, section 11.22.6, 11.22.6.3 FTM procedure, negotiation, pp. 78-86.
(Continued)

*Primary Examiner* — Erika A Washington
(74) *Attorney, Agent, or Firm* — Thien T. Nguyen

(57) ABSTRACT

A responder user equipment (UE) in separate ranging sessions may determine whether there is a collision between the ranging signals assigned to broadcast in the separate ranging sessions. A collision in the ranging signals is detected when the ranging signals have the same frequencies and broadcast times, e.g., the broadcast time of one ranging signal is within a predetermined amount of time for the other ranging signal. When a collision in the ranging signals is detected, the responder UE sends a message to the initiator UE indicating the possibility of a collision. Available times for broadcasting the ranging signals may be determined, e.g., by the responder UE or the initiator UE. The initiator UE may initiate a new ranging session based on the available times for broadcasting the ranging signal or may proceed with the ranging session with the possibility that the responder UE will not participate.

31 Claims, 9 Drawing Sheets

(51) Int. Cl.
      *H04W 4/029*       (2018.01)
      *G01S 13/74*        (2006.01)
      *H04W 4/02*        (2018.01)

(52) U.S. Cl.
      CPC ....... *H04W 72/005* (2013.01); *H04W 72/044* (2013.01)

(56) References Cited

OTHER PUBLICATIONS

International Search Report and Written Opinion—PCT/US2022/011863—ISA/EPO—dated Apr. 12, 2022.
Samsung: "Simultaneous Positioning Requests", 3GPP TSG RAN WG2 #67, 3GPP Draft, R2-094251 Simultaneous Positioning Requests, 3rd Generation Partnership Project (3GPP), Mobile Competence Centre, 650, Route Des Lucioles, F-06921 Sophia-Antipolis Cedex, France, No. Shenzhen, China, Aug. 24-28, Shenzhen, China, 5 Pages, Aug. 17, 2009, Aug. 17, 2009 (Aug. 17, 2009), XP050352507, [retrieved on Aug. 17, 2009] sections 2, 3.

\* cited by examiner

OPTIMIZATION OF RANGING SESSIONS INITIATED BY VEHICLE AND PEDESTRIAN UES

BACKGROUND

Background Field

The subject matter disclosed herein relates to wireless communications systems, and more particularly to methods and apparatuses for ranging or positioning of user equipment in a distributed wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

Coordinated or automated driving requires communications between vehicles, which may be direct or indirect, e.g., via an infrastructure component such as a roadside unit (RSU). For vehicle safety applications, both positioning and ranging are important. For example, vehicle user equipments (UEs) may perform positioning and ranging using sidelink signaling, e.g., broadcasting ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Round trip time (RTT), for example, is a technique commonly used for determining a range between transmitters. RTT is a two-way messaging technique in which the time between sending a ranging signal from a first device to receiving an acknowledgement (e.g., in the form of return ranging signal) from a second device (minus processing delays) corresponds to the distance (range) between the two devices.

Ranging sessions in a distributed system, i.e., without infrastructure support to coordinate messaging, may result in multiple ranging sessions occurring simultaneously that may include overlapping sets of participating UEs. For example, multiple initiator UEs may initiate separate ranging sessions with the same responder UE, which may result in colliding messages or signaling in the ranging sessions. Accordingly, where multiple ranging sessions in a distributed system may occur simultaneously, the lack of control or optimization of the ranging sessions may inhibit participation of responder UEs and may undermine ranging and positioning of the UEs.

SUMMARY

A responder user equipment (UE) that is included in separate ranging sessions may determine whether there is a collision between that ranging signals that it is assigned to broadcast in the separate ranging sessions. A collision in the ranging signals, for example, may be detected when the ranging signals have the same frequencies and broadcast times, e.g., the broadcast time of one ranging signal is within a predetermined amount of time for the other ranging signal. When a collision in the ranging signals is detected, the responder UE sends a message to the initiator UE indicating the possibility of a collision. The responder UE may additionally determine available times for broadcasting the ranging signals and provide the available times to the initiator UE or the initiator UE may determine available times. The initiator UE may reconstruct and initiate a new ranging session based on the available times for broadcasting the ranging signal or may proceed with the ranging session with the possibility that the responder UE will not participate.

In one implementation, a method of ranging between user equipments (UEs) performed by a responder UE, includes receiving a first pre-ranging request message from a first initiator UE to initiate a first ranging session, the first pre-ranging request message comprising first ranging signal resources including a time and frequencies for the responder UE to broadcast a first ranging signal in the first ranging session; receiving a second pre-ranging request message from a second initiator UE to initiate a second ranging session, the second pre-ranging request message comprising second ranging signal resources including a time and frequencies for the responder UE to broadcast a second ranging signal in the second ranging session; determining a collision between the first ranging signal and the second ranging signal based on the first ranging signal resources and the second ranging resources; sending a first pre-ranging response message to the first initiator UE acknowledging the first pre-ranging request message; and sending a second pre-ranging response message to the second initiator UE indicating the collision with the second ranging signal resources for the second ranging signal.

In one implementation, a responder user equipment configured for ranging between UEs, includes a wireless transceiver configured to wirelessly communicate with entities in a wireless network; at least one memory; and at least one processor coupled to the wireless transceiver and the at least one memory, wherein the at least one processor is configured to: receive a first pre-ranging request message from a first initiator UE to initiate a first ranging session, the first pre-ranging request message comprising first ranging signal resources including a time and frequencies for the responder UE to broadcast a first ranging signal in the first ranging session; receive a second pre-ranging request message from a second initiator UE to initiate a second ranging session, the second pre-ranging request message comprising second ranging signal resources including a time and frequencies for the responder UE to broadcast a second ranging signal in the second ranging session; determine a collision between the first ranging signal and the second ranging signal based on the first ranging signal resources and the second ranging resources; send a first pre-ranging response message to the first initiator UE acknowledging the first pre-ranging request message; and send a second pre-ranging response message to the second initiator UE indicating the collision with the second ranging signal resources for the second ranging signal.

In one implementation, a responder user equipment configured for ranging between UEs, the responder UE includes means for receiving a first pre-ranging request message from a first initiator UE to initiate a first ranging session, the first pre-ranging request message comprising first ranging signal resources including a time and frequencies for the responder UE to broadcast a first ranging signal in the first ranging session; means for receiving a second pre-ranging request message from a second initiator UE to initiate a second ranging session, the second pre-ranging request message comprising second ranging signal resources including a time and frequencies for the responder UE to broadcast a second ranging signal in the second ranging session; means for determining a collision between the first ranging signal and the second ranging signal based on the first ranging signal resources and the second ranging resources; means for sending a first pre-ranging response message to the first initiator UE acknowledging the first pre-ranging request message; and means for sending a second pre-ranging response message to the second initiator UE indicating the collision with the second ranging signal resources for the second ranging signal.

In one implementation, a non-transitory storage medium including program code stored thereon, the program code is operable to configure at least one processor in a responder user equipment for ranging between UEs, the responder UE the program code comprising instructions to: receive a first pre-ranging request message from a first initiator UE to initiate a first ranging session, the first pre-ranging request message comprising first ranging signal resources including a time and frequencies for the responder UE to broadcast a first ranging signal in the first ranging session; receive a second pre-ranging request message from a second initiator UE to initiate a second ranging session, the second pre-ranging request message comprising second ranging signal resources including a time and frequencies for the responder UE to broadcast a second ranging signal in the second ranging session; determine a collision between the first ranging signal and the second ranging signal based on the first ranging signal resources and the second ranging resources; send a first pre-ranging response message to the first initiator UE acknowledging the first pre-ranging request message; and send a second pre-ranging response message to the second initiator UE indicating the collision with the second ranging signal resources for the second ranging signal.

In one implementation, a method of ranging between user equipments (UEs) performed by an initiator UE, includes transmitting a first pre-ranging request message to a responder UE to initiate a first ranging session, the first pre-ranging request message comprising first ranging signal resources including a time and frequencies for the responder UE to broadcast a first ranging signal in the first ranging session; and receiving a first pre-ranging response message from the responder UE indicating a collision between the first ranging signal resources for the first ranging signal and second ranging signal resources for a second ranging signal for a second initiator UE.

In one implementation, an initiator user equipment (UE) configured for ranging between UEs, the initiator UE, includes a wireless transceiver configured to wirelessly communicate with entities in a wireless network; at least one memory; and at least one processor coupled to the wireless transceiver and the at least one memory, wherein the at least one processor is configured to: transmit a first pre-ranging request message to a responder UE to initiate a first ranging session, the first pre-ranging request message comprising first ranging signal resources including a time and frequencies for the responder UE to broadcast a first ranging signal in the first ranging session; and receive a first pre-ranging response message from the responder UE indicating a collision between the first ranging signal resources for the first ranging signal and second ranging signal resources for a second ranging signal for a second initiator UE.

In one implementation, an initiator user equipment (UE) configured for ranging between UEs, the initiator UE includes means for transmitting a first pre-ranging request message to a responder UE to initiate a first ranging session, the first pre-ranging request message comprising first ranging signal resources including a time and frequencies for the responder UE to broadcast a first ranging signal in the first ranging session; and means for receiving a first pre-ranging response message from the responder UE indicating a collision between the first ranging signal resources for the first ranging signal and second ranging signal resources for a second ranging signal for a second initiator UE.

In one implementation, a non-transitory storage medium including program code stored thereon, the program code is operable to configure at least one processor in an initiator user equipment (UE) for ranging between UEs, the initiator UE, the program code comprising instructions to: transmit a first pre-ranging request message to a responder UE to initiate a first ranging session, the first pre-ranging request message comprising first ranging signal resources including a time and frequencies for the responder UE to broadcast a first ranging signal in the first ranging session; and receive a first pre-ranging response message from the responder UE indicating a collision between the first ranging signal resources for the first ranging signal and second ranging signal resources for a second ranging signal for a second initiator UE.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
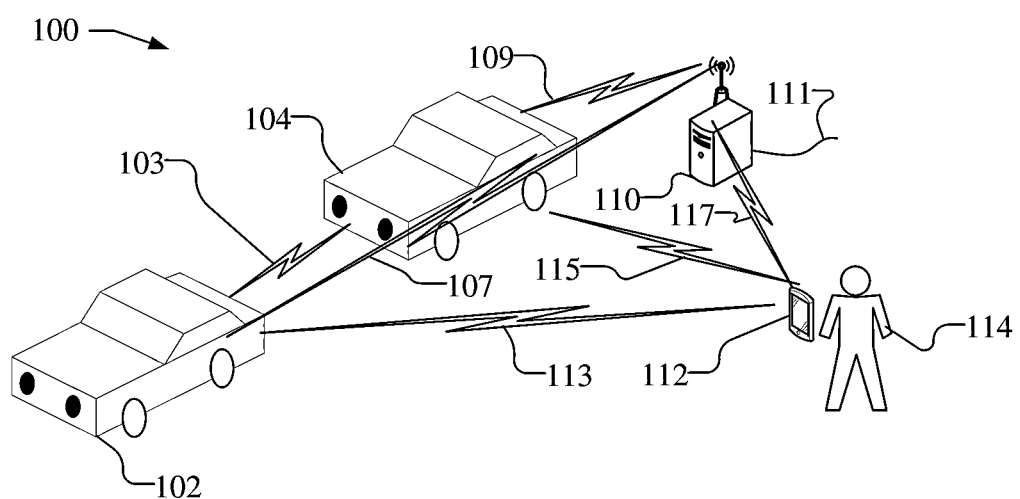
FIG. 1 illustrates a wireless communication system illustrating distributed communications, including ranging signaling to support multiple ranging sessions and/or positioning.

A distributed approach may be used for ranging and positioning of vehicles, roadside units (RSU), and pedestrian and may avoid the need for a centralized base station to coordinate and relay communications. Such communications may be used, for example, for automated driving and vehicle safety applications. Communications used in a distributed approach may be made directly, e.g., between vehicles, or between vehicles and a RSU or pedestrian. These communications may include messages and information elements (IEs) with which a vehicle may provide information necessary for automated driving.

For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle, sometimes referred to as V-UE, and received by other V-UEs and/or infrastructure, e.g., RSU, or UEs held by a pedestrian, using direct communication systems, such as dedicated short-range communication (DSRC), cellular Vehicle-to-Everything (C-V2X) communication, and even 5G New Radio (NR) communications. PRS signals are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OTDOA).

In a distributed system, an individual UE is able to range with respect to other UEs that are nearby using messages and positioning signals that are transmitted directly to the other UEs. In an RTT-based ranging session, for example, multiple messages and signals are transmitted and received by each UE. For example, an initial set of pre-ranging signal messages (pre-PRS messages) are transmitted and received to request and accept a ranging session, followed by broadcasting the ranging signals (PRS signals) for measurement, which is followed by a set of post-ranging signal messages (post-PRS messages) that exchange measurement payloads. For RTT-based ranging and positioning, for example, the time of arrival (TOA) and time of departure (TOD) measurements of transmitted and received PRS signals may be provided in the post-PRS messages and used by each UE pair to determine the range between the UEs. The pre-PRS and post-PRS messages may be sent over a licensed spectrum to guarantee reliability, while the PRS signals may be broadcast over an unlicensed spectrum (e.g., to enjoy a larger available bandwidth in e.g., UNI-III spectrum).

The distributed mechanism ensures a minimum overhead, but multiple nearby UEs may initiate separate ranging sessions independently of each other. Thus, multiple uncoordinated ranging sessions may be autonomously initiated by separate UEs. For example, without overhead communications to control ranging sessions, multiple UE may separately broadcast their own pre-PRS signals to the same set of responder UEs resulting in independent ranging sessions that include the same responder UEs and that occur at the same time. For example, multiple V-UEs may initiate separate ranging sessions with the same set of RSUs. Moreover, nearby pedestrian held UEs may likewise initiate ranging sessions with the same set of RSUs. Thus, multiple separate ranging sessions may be simultaneously initiated with one or more of the same responder UEs. The separate ranging sessions, by way of example, may be initiated by initiator UEs, e.g., because they are out of coverage from each other and thus will not include the other initiator UE in the ranging session and/or do not receive the initiating pre-PRS message from the other initiator UE. Separate ranging sessions may be initiated by separate initiator UEs for other reasons, such as limiting responder UEs to UEs that know their positions (e.g., anchor UEs) and that can be used for positioning of the initiator UE, etc.

A responder UE that is included in multiple simultaneous ranging sessions may have messages or signals that collide in the separate ranging sessions. For example, a responder UE may receive a pre-PRS message from multiple initiator UEs that request PRS signals to be broadcast by the responder UE on the same channel, e.g., CH 171, and approximately the same time, and thus, collide. The responder UE may not be able to use the same channel to broadcast PRS to both initiator UEs if the times for broadcasting the PRS signals in each ranging session are close.

Accordingly, in an implementation, as discussed herein, a responder UE that receives multiple pre-ranging request messages that include time and frequencies for broadcasting ranging signals may determine if a collision between the ranging sessions in the separate ranging sessions exist. The collision may be detected if the time to broadcast the ranging signals are within a predetermined amount of time of each other and the same frequencies are to be used for broadcasting the ranging signals. The responder UE may send an indication that there is a collision in the ranging signals to at least one of the initiator UEs. For example, the responder UE may send an acknowledgement of a first initiator UE and may send the indication of a collision to the other initiator UE(s). In some implementations, the responder UE may determine an available time for broadcasting additional ranging signal(s) and may provide the available time with the indication of collision. In some implementations, an initiator UE that receives an indication of collision may continue with the ranging session and the responder UE may broadcast the ranging signal if possible, i.e., the collision does not occur. In another implementation, the initiator UE that receives the indication of collision may send another pre-ranging request with a different time for the responder UE to broadcast the ranging signals. Accordingly, the multiple ranging sessions may proceed with a reduced likelihood of collision of signal transmission by overlapping responder UEs, thereby increasing the probability of successful ranging and positioning of the UEs.

FIG. 1 illustrates a wireless communication system 100 illustrating distributed communications, including ranging signaling to support multiple ranging sessions and/or positioning, as described herein. Wireless communication system 100 illustrates a first vehicle 102 with a first wireless device, e.g., V-UE 102, in wireless communications with another V-UE 104, illustrated as a second vehicle. The V-UE 102 and V-UE 104 may comprise, but are not limited to, an on-board unit (OBU), a vehicle or subsystem thereof, or various other communication devices. The V-UEs 102 and 104 function and provide communications on behalf of their associated vehicles and, accordingly, may be sometimes referred to herein simply as vehicles 102 and 104 or UEs 102 and 104. The first UE 102 and second UE 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as Advanced Driver Assistance System (ADAS), which helps drivers with critical decisions, such as lane changes, speed changes, overtaking speeds, and may be used to assist in parking as discussed herein. Low latency communications are used in V2X and are therefore suitable for precise relative positioning, e.g., using ranging signals, such as one way ranging, RTT, TDOA, etc.

In general, there are two modes of operation for V2X services, as defined in Third Generation Partnership Project (3GPP) TS 23.285. One mode of operation uses direct wireless communications between V2X entities, which may sometimes be referred to as sidelink communication. The other mode of operation uses network based wireless communication between entities. The two modes of operation may be combined, or other modes of operation may be used if desired.

The wireless communication system 100 may operate using direct or indirect wireless communications between the UE 102 and UE 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, UE 102 and UE 104 may directly communicate using with a Vehicle-to-Vehicle (V2V) communication link 103. UE 102 and UE 104 may similarly directly communicate with roadside unit (RSU) 110 via Vehicle-to-Infrastructure (V2I) communication links 107 and 109, respectively. The RSU 110 may include a backhaul connection to a network, illustrated by wired connection 111, but may via a wireless Uu interface to a base station. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The RSU 110 may be used for ranging with UEs 102, 104, or other UEs, and because the position of the RSU 110 may be known precisely, the RSU 110 may be used as an anchor UE with which a position of the UE 102, 104 or other UEs may be determined. The RSU 110 may sometimes be referred to herein as UE 110. The UEs 102, 104 and UE 110 may communicate with additional entities, such as additional vehicles, RSUs or with a UE 112 held by pedestrian 114 using direct communication links. For example, UE 102 may communicate with UE 112 via V2V communication link 113, UE 104 may communicate with UE 112 via V2V communication link 115, and UE 110 may communicate with UE 112 via V2I communication link 117.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, UE 102 and UE 104 may indirectly communicate with each other, e.g., through the RSU 110 via the V2I communication links 107 and 109, respectively or through other network infrastructure (not shown), e.g., using cellular vehicle-to-everything (CV2X). For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

UEs 102 and 104 may initiate and perform ranging/positioning sessions, including sending pre-PRS messages, broadcasting PRS, and sending post-PRS messages on links 103, 107, 109, 113 or 115, with which the range or relative positions between UEs 102 and 104 may be determined. The PRS broadcast by UEs 102 and 104 may be any signal suitable for ranging, e.g., as defined for DSRC or C-V2X. The PRS may be broadcast on licensed or unlicensed spectrum. For example, in some implementations, PRS may be broadcast on one or more Unlicensed National Information Infrastructure (UNII) radio bands including, for example, one or more of the UNII-1 radio band, the UNII-2A radio band, the UNII-2B radio band, or the UNII-3 radio band. When broadcasting on unlicensed spectrum, listen-before-transmit (LBT) protocols may be employed.

Where UEs 102 and 104 broadcast PRS in a V2V link 103, the range or relative positions between UEs 102 and 104 may be determined directly. Where UE 102 and 104 broadcast PRS in V2I links 107 and 109 or via links 113 and 115, the range or relative positions between UE 102 and UE 110 or UE 112 and between UE 104 and UE 110 or UE 112 may be determined directly.

The direct wireless communications between the UE 102 and 104 and UE 110 and UE 112, do not require any network infrastructure and enable low latency communications, which is advantageous for precise ranging or positioning. Accordingly, such direct wireless communications may be desirable for ranging over short distances, e.g., with nearby vehicles or infrastructure.

The UEs, e.g., any of V-UE 102, V-UE 104, RSU 110, and UE 112, shown in FIG. 1, may be configured to perform ranging and/or positioning operations, such as RTT-based ranging.

Figure 2:
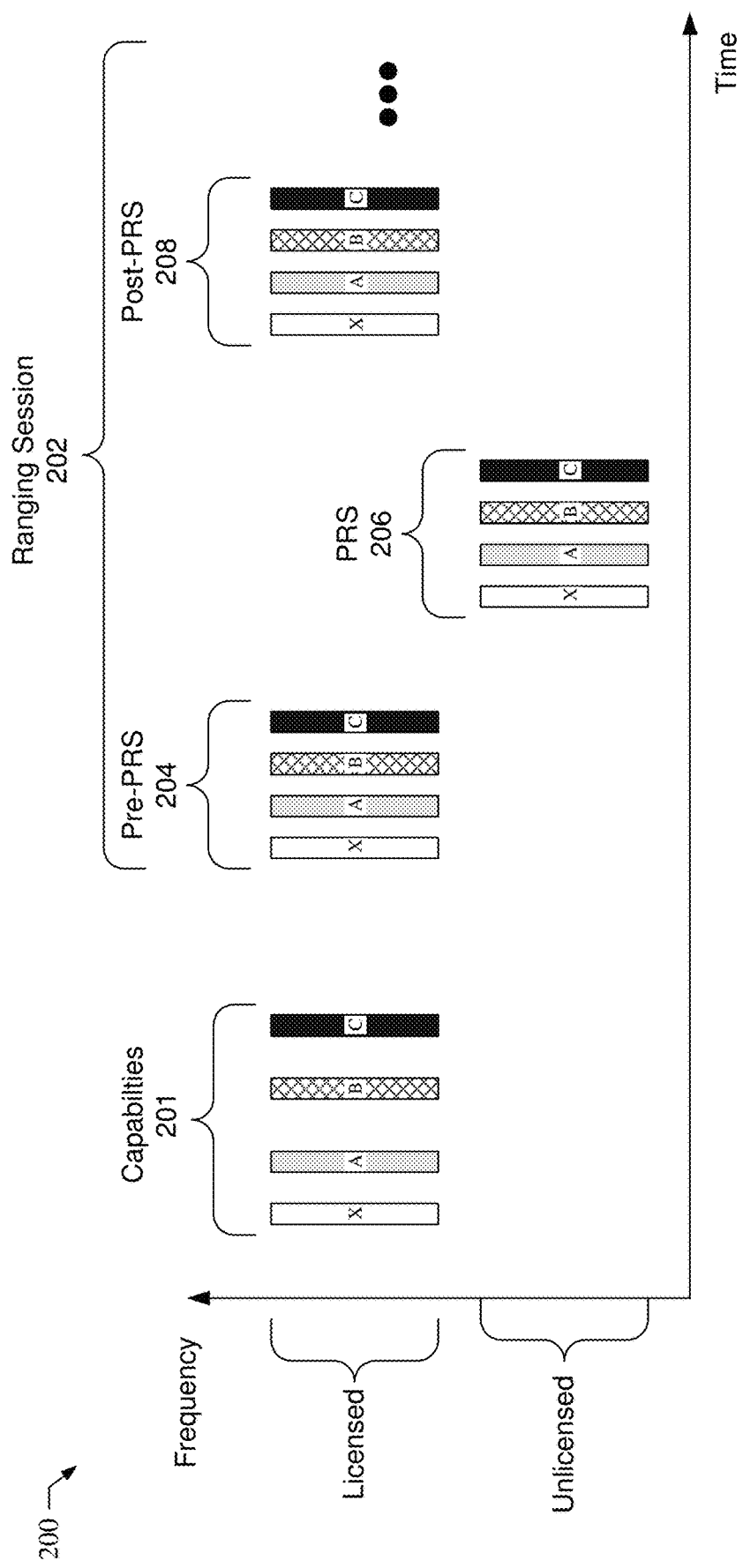
FIG. 2 illustrates a signaling graph indicating the timing and frequencies of various messages that may be sent and received by an initiating UE and three responder UEs for a ranging or positioning session.

FIG. 2 illustrates, by way of example, a signaling graph 200 indicating the timing and frequencies of various messages that may be sent and received by an initiator UE (UEX) and three responder UEs (UEA, UEB, and UEC) for a ranging or positioning session. For example, FIG. 2 illustrates capabilities messages 201 and an RTT-based ranging session 202, during which a number of messages are sent between an initiator UE and responder UEs, including pre-PRS messages 204 to request and accept a ranging session, the PRS signals 208 for measurement, and post-PRS messages 208 to exchange measurement payloads. Each set of pre-PRS 204, PRS 206, and post-PRS 208 may be considered a single unit or PRS cycle. Each PRS cycle includes a pre-PRS message 204, PRS signal 206, and post-PRS message 208, and may therefore be referred to herein as a ranging session 202. The ranging sessions (PRS cycles) may be periodic with a period T_r, and the capabilities messages may be periodic with a period T_c, where $T\_r > T\_c$. In FIG. 2, the signaling from the initiator UEX is illustrated with white boxes that are labeled "X," signaling from a first responder UEA is illustrated with gray boxes that are labeled an "A," signaling from a second responder UEB is illustrated with hatched boxes that are labeled with a "B," and signaling from a third responder UEC are illustrated with block boxes that are labeled with a "C." The signaling from the initiator UEX is the first box in each of the pre-PRS messages 204, the PRS signals 206, and the post-PRS messages 208, and is followed by the responder UEs (UEA, UEB, and UEC).

As illustrated, the UEs, including the initiator UE and responder UEs, may broadcast capabilities messages 201. The capabilities messages are not part of the ranging session but may include information that may be used by the initiator UE to initiate a ranging session with selected UEs. For example, the capabilities message may be on the ITS spectrum and may include the UE ID, the ranging capability of the UE, the channel that the UE is configured to use, MIMO (Multiple Input Multiple Output) capabilities, etc. The capabilities message may additionally indicate whether the UE needs to determine its position or if its position is known and it may serve as an anchor UE for positioning other UEs. It should be understood that while FIG. 2 illustrates the capabilities messages 201 as having the same order as the messages in the ranging session 202, the order may, in fact, differ.

The pre-PRS messages 204 (e.g., pre-ranging messages) are used by the UEs to request and acknowledge a ranging session. As illustrated, the pre-PRS messages 204 may be transmitted on a licensed spectrum to guarantee reliability. The pre-PRS messages 204 may be broadcast or unicast, e.g., with Radio Resource Control (RRC) connections. The initiator UEX broadcasts an initial pre-PRS message 204 (PrePRSRequest) to initiate the ranging session between the initiator UE and the responder UEs and to provide information for the ranging session (illustrated with the white box labeled X). For example, the pre-PRS message 204 from the initiator UE, may include IDs for participating UEs, i.e., the initiator and responder IDs. The pre-PRS request message may include a ranging session ID, the channel for the PRS broadcast by the initiator UEX and responder UEs, the PRS broadcast time, the maximum listen before transmit (LBT) time, etc. The pre-PRS request message from the initiator UEX for example may include a PRS ID that will be used by the initiator UE, and in some implementations, the PRS ID to be used by the responder UEs. If the PRS ID will be fixed over multiple PRS exchanges (e.g., for multiple units in the ranging session 202), the initiator UE may include an ID associated with the current PRS exchange, e.g., a session ID. The initiator UE may determine when the PRS signals 206 will be transmitted, which, for example, may be configured from an upper layer in the initiator UE. The initiator UE may indicate the timing of the PRS by sending the time slot number nears to the desired PRS transmission time. In some implementations, the time slot may be subject to local clock error. The initiator UE may further provide the timing of PRS to be sent by the responder UEs, as well as a maximum LBT time or other maximum predetermined delay for broadcasting the PRS. The initiator UE may further indicate the frequency that will be used to broadcast the PRS signal 206 by the initiator UE and the responder UEs. For example, the frequency of PRS may be selected from an available set of total bandwidths or the frequency of PRS may be selected by sensing the interference and choosing one or more channels whose average interference Reference Signal Receive Power (RSRP) is less than a threshold. The initiator UE may indicate the number of PRS cycles that it will execute during the ranging session 202. The number of PRS cycles may be configured from an upper layer. The pre-PRS message for each PRS cycle, for example, may indicate the current PRS cycle with respect to the total PRS cycles requested, where the number of the current cycle increments after completion of each cycle.

The initial pre-PRS request message from the initiator UE is received and decoded by the responder UEs, which are identified in the initial pre-PRS message. The responder UEs may send pre-PRS messages 204 in response (illustrated with gray, hatched, and black boxes labeled with A, B, C, respectively) which may acknowledge the pre-PRS request message, which may additionally provide information for the ranging session. Each responder UE may indicate the PRS ID that it will use or may indicate that it will use the PRS ID that was indicated in the initial pre-PRS message. If the PRS ID will be fixed over multiple PRS exchanges (e.g., multiple PRS cycles in the ranging session 202), the responder UE may include the ID associated with the current PRS exchange, e.g., a session ID, that was received in the initial pre-PRS message from the initiator UE. The responder UEs may broadcast the pre-PRS messages 204, which may be received by the initiator UE (and other responder UEs). In some implementations, each responder UE may transmit the pre-PRS message 204 using unicast with RRC connection to the initiator UE.

The PRS signals 206 are exchanged by the participating UEs. The initiator UE and responder UEs know the expected timing and frequencies of the PRS signals and know the PRS ID (and any session ID used with the exchanged) that is used to broadcast the PRS signals 206. The PRS signals 206 may be, for example, a Quadrature Phase Shift Keying (QPSK) modulated pseudo-noise (PN) sequence and may include the ranging session ID. The PRS signals 206 may be broadcast on an unlicensed spectrum, which may be subject to LBT constraints. In some implementations, when using the unlicensed spectrum, the initiator UEX may reserve the transmission for responder UEs UEA, UEB, and UEC, so that the responder UEs may not need to perform LBT. For example, the initiator UEX broadcasts its PRS signal 206 (white box labeled with X) at the determined time that was indicated in the initial pre-PRS message 204. In some implementations, the initiator UE broadcasts its PRS signal at the determined time plus a random waiting time due to the LBT constraints when the PRS signal is deployed in the unlicensed spectrum. In some implementations, the LBT may be a Category 2 LBT with a fixed window Clear Channel Assessment (CCA) or a Category 4 LBT with a varying window CCA. The initiator UE uses the PRS signal that corresponds to the PRS ID and uses the frequency resources that were indicated in its initial pre-PRS message 204. The initiator UE stores the time instance that the PRS signal is broadcast, and the responder UEs store the time instance that the PRS signal is received. In some implementations, the time instances may be subject to local clock error.

Similar to the initiator UE, each responder UE broadcasts its PRS signal 206 (illustrated with gray, hatched, and black boxes labeled with A, B, C, respectively) at the time and frequencies that were assigned in the initial pre-PRS message 204 by the initiator UE. In some implementations, each responder UE may broadcast its PRS signal at the determined time plus a random waiting time due to the LBT constraints when the PRS signal is deployed in the unlicensed spectrum. In some implementations, the LBT may be a Category 2 LBT with a fixed window CCA or a Category 4 LBT with a varying window CCA. Each responder UE uses the PRS signal that corresponds to the PRS ID that was indicated in its pre-PRS messages 204. Each responder UE stores the time instance that its PRS signal is broadcast, and the initiator UE (and optionally other responder UEs) store the time instance that the PRS signal from each responder UE is received. In some implementations, the time instances may be subject to local clock error.

Thus, each UE records the time of departure (ToD) of its broadcast PRS signal and measures the time of arrival (ToA) of the PRS signal received from the other UEs. The PRS signal may be any signal suitable for ranging, e.g., as defined for DSRC or C-V2X, such as QPSK modulated PN sequence. The ToA and ToD resolution of the PRS signals increase with an increased frequency bandwidth. In some implementations, the angle of departure (AoD) and angle of arrival (AoA) of the broadcast and received PRS signals may also be measured. Broadcasting on an unlicensed spectrum is advantageous as a wider frequency band is available. For example, in some implementations, PRS may be broadcast on one or more UNII radio bands including, for example, one or more of the UNII-1 radio band, the UNII-2A radio band, the UNII-2B radio band, or the UNII-3 radio band.

The post-PRS messages 208 are sent by each UE to exchange measurement payloads. As illustrated, the post-PRS messages 208 may be transmitted on a licensed spectrum to guarantee reliability. In some implementations, the post-PRS messages 208 may be broadcast or unicast with RRC connection. The initiator UEX sends its post-PRS message 208 (illustrated as the white box labeled with X) and indicates when it broadcast the PRS signal 206 (ToD) and when the PRS signals from the responder UEs were received (ToA). In some implementations, the ToA may be computed as a relative time with respect to the ToD of its broadcast PRS signal, and the relative time may be provided. In some implementations, the relative time may be approximated to the closest multiple of time scale shared by the initiator UE and the responder UEs. In some implementations, the initiator UE may provide an indication of its location in the post-PRS message 208, if known. For example, the location of the initiator UE may be the location at a specific time, such as the broadcast time of its PRS signal or the arrival time of the PRS signal from a responder UE. The post-PRS message 208 may further include the AoD of its PRS signal 206 and the AoA of the PRS signals 206 received from the responder UEs, the orientation of initiator UE, a broadcast indicator of the PRS signal 206, a reception indicator of PRS from the responder UEs, as well as other related measurements, e.g., including map information, the locations of reflectors with respect to the UE, etc.

Similar to the initiator UE, each responder UEs sends its post-PRS signal 208 (illustrated with gray, hatched, and black boxes labeled with A, B, C, respectively) to provide the measurement payloads. Each responder UE may indicate whether it received the PRS signal from the initiator UE and may indicate when it broadcast the PRS signal 206 (ToD) and when the PRS signals from the initial UE (and optionally from other responder UEs) was received (ToA). In some implementations, the ToD may be computed as a relative time with respect to the ToA of the PRS signal from the initiator UE (and optionally with respect to the ToA of the PRS from other responder UEs). In some implementations, the relative time may be approximated to the closest multiple of time scale shared by the initiator UE and the responder UE. In some implementations, the responder UE may provide an indication of its location in the post-PRS message 208, if known. For example, the location of the responder UE provided may be the location at a specific time, such as the arrival time of PRS signal from the initiator UE or the departure time of its broadcast PRS signal. The post-PRS message 208 may further include the AoD of its PRS signal 206 and the AoA of the PRS signals 206 received from the initiator UEX (and optionally received from the other responder UEs), the orientation of initiator UE, a broadcast indicator of the PRS signal 206, a reception indicator of PRS from the responder UEs, as well as other related measurements, e.g., including map information, the locations of reflectors with respect to the UE, etc.

After receiving the post-PRS messages, the initiator UE may compute its range (and in some implementations its location), e.g., using a Kalman filter, and then may transmit the next cycle of pre-PRS messages at a time that is indicated by an upper layer or that is autonomously determined by the initiator UE.

The time between the first pre-PRS message 204 and the last post-PRS message 208 may be the duration of the ranging session and may be, e.g., 100 msec. The duration of each broadcast PRS signals 206 may be, e.g., 47 µsec. In some implementations, multiple PRS cycles, e.g., multiple instances of pre-PRS messages 204, PRS 206, and post-PRS messages 208, may be used together to provide higher accuracy.

Both the initiator UE and the responder UEs may determine the range between itself and each other UE in the ranging session based on the ToD and the ToA of the broadcast PRS signals. For example, the RTT between any pair of UEs (which may be any pair of initiator and responder UEs) may be determined based on the $ToD_i$ and $ToA_i$ for the $PRS_i$ signals (where i=1 for PRS broadcast from a first UE and i=2 for PRS broadcast by a second UE), as the difference between the $ToD_1$ and $ToA_2$ minus the difference between the $ToA_1$ and the $ToD_2$, e.g., as follows.

$$RTT=(ToD_1-ToA_2)-(ToA_1-ToD_2) \qquad \text{eq. 1}$$

The RTT value is the round-trip time for the signal, and thus, the range (distance) between the $UE_1$ and $UE_2$ may be determined as RTT/2c, where c is the speed of light.

If the position of one or more responder UEs is known, the range between the initiator UE and the responder UEs may be used along with the known position of the one of the responder UE to determine the position of the other UE, and thus, the ranging session may be a positioning session. The responder UEs with known positions that may be used for positioning may sometimes be referred to herein as anchor UEs. The positions of anchor UEs may be provided to other UEs through messaging, e.g., in the pre-PRS messages or in the post-PRS messages. If the range to multiple anchor UEs is determined, the positions of the multiple anchor UEs may be used in multilateration to determine the position of the initiator UE (or other responder UEs).

The angle measurements, e.g., AoD, and AoA, may be used, e.g., for assistance in positioning. By way of example, based on the range between two UEs and a measured AoA, the relative positions of the two UEs may be determined. With the relative positions of the UEs determined, if the actual position of one of the UEs is known (which may be provided, e.g., in the pre-PRS messages 204 or post-PRS messages 208), the actual position of the other UE may be determined. If the position of two UEs are known by a third UE, the ranges between the third UE and each of the other two UEs will produce two possible positions for the third UE, which may be resolved based on AoD/AoA information. The AoD may be useful if the resolution of the AoA is poor or incorrect, for example. AoD may be measured, e.g., based on a known orientation of the UE (for example, determined by a magnetometer), and the direction of the transmitted signal relative to the UE (e.g., relative to an antenna array of the UE used for beamforming). The AoA may be measured based on the phase difference of a received signal at different antenna elements of an antenna array and the known orientation of the UE, for example determined by a magnetometer). Additionally, geographic constraints may be used to assist in positioning, for example, by constraining possible positions of a vehicle based on positions that are accessible to a vehicle, such as a road.

As discussed above, due to the distributed mechanism for ranging, it is possible that multiple UEs may initiate independent ranging sessions that include at least some of the same responder UEs at approximately the same time. For example, two initiating UEs may separately broadcast their own pre-PRS signals to the same set of responder UEs resulting in two independent ranging sessions that include the same responder UEs and that occur at the same time. By way of illustration, an initiator UEX may send a pre-ranging request message to responder UEA with ranging session ID 182, and PRS channel 171, and a second initiator UEY may send a separate pre-ranging request message to the same responder UEA with a ranging session ID 183, and PRS channel 171. The responder UEA, thus, is included in both ranging sessions ID 182 and ID 183, but it might not be able to use channel 171 for broadcasting the PRS in both ranging sessions for initiator UEX and initiator UEY if the PRS broadcast times are close.

Figure 3:
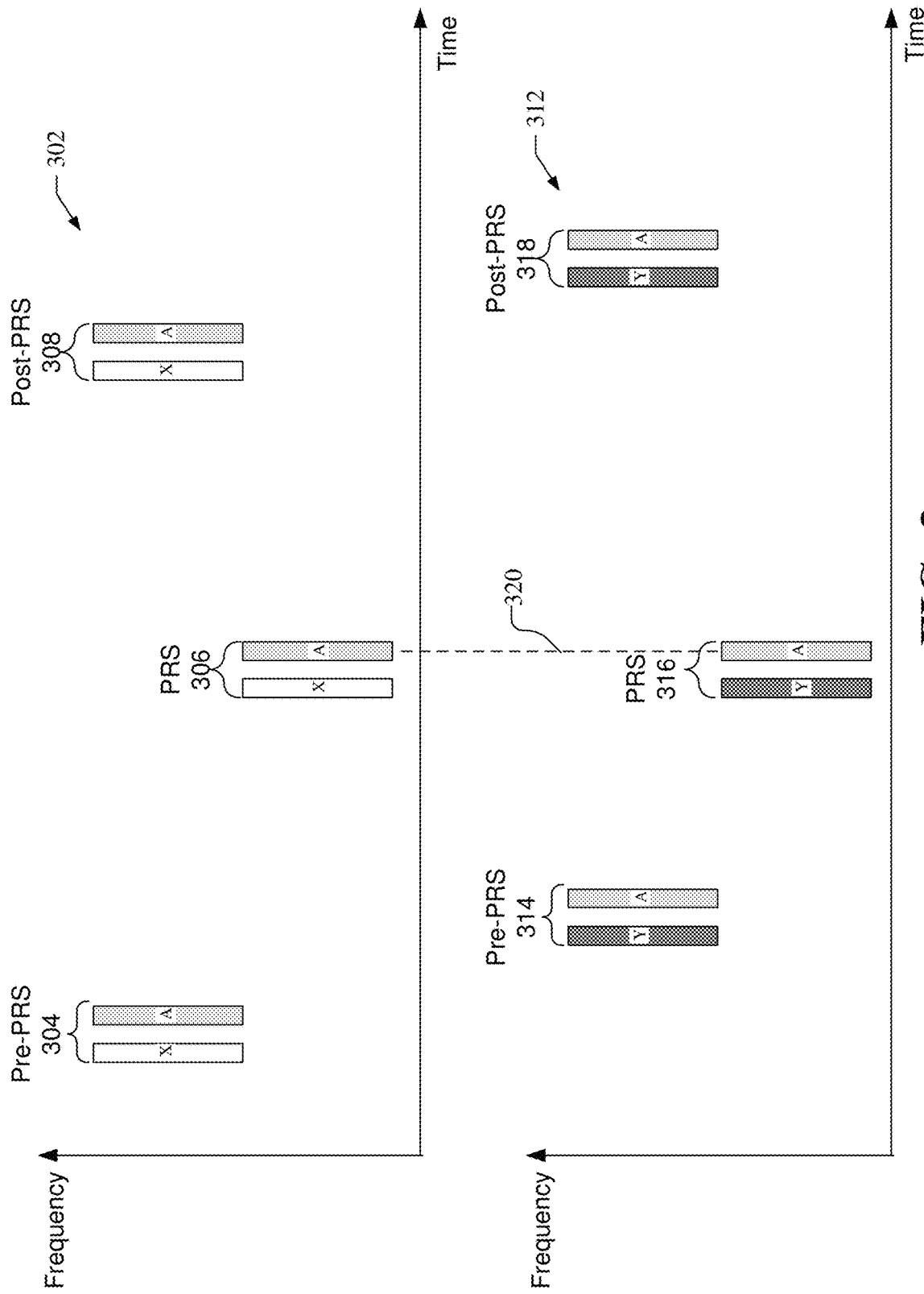
FIG. 3 illustrates a graph showing two separate sets of ranging sessions in which PRS signals to be broadcast by a responder collide.

FIG. 3, by way of example, illustrates a graph showing two separate sets of ranging sessions 302 and 312 in which PRS signals 306 and 316 for a responder UEA that may collide. A first ranging session 302, which includes pre-PRS messages 304, PRS signaling 306, and post-PRS messages 308 is between a first initiator UEX and responder UEA. The signaling from the initiator UEX is illustrated with white boxes that are labeled "X" and the signaling from the responder UEA is illustrated with gray boxes that are labeled with an "A." It should be understood that the ranging sessions 302 and 312 may include multiple responder UEs, but that only responder UEA is illustrated. A second ranging session 312, which includes second pre-PRS messages 314, second PRS signaling 316, and second post-PRS messages 318 is between a second initiator UEY and the same responder UEA. The signaling from the initiator UEY in ranging session 312 is illustrated with dark gray boxes that are labeled "Y" and the signaling from the responder UEA is illustrated with light gray boxes that are labeled with an "A."

The first initiator UEX may send the pre-PRS message 304 to the responder UEA that, as discussed above, may include among other things the ranging session ID, the channel for the PRS broadcast by the responder UEA, the time for the PRS broadcast by the responder UEA, and the maximum LBT or other delay time permitted for the broadcast PRS. The second initiator UEY may send the second pre-PRS message 314 to the responder UEA shortly after pre-PRS message 304 sent by the first initiator UEX. The second pre-PRS message 314, similar to the first pre-PRS message 304, may include among other things the ranging session ID, the channel for the PRS broadcast by the responder UEA, the time for the PRS broadcast by the responder UEA, and the maximum LBT or other delay time permitted for the broadcast PRS. The second pre-PRS message 314 may include the same channel and time for the PRS broadcast by the responder UEA as provided in the first pre-PRS message 304, as indicated by line 320 between the PRS signal 306 from the responder UEA (with the light gray box labeled A) in first ranging session 302 and the PRS signal 316 from the responder UEA (with the light gray box labeled A) in second ranging session 312.

Thus, as can be seen in FIG. 3, the responder UEA's broadcast time for the first PRS signals 306 in the first ranging session 302 and the broadcast time for the second PRS signals 316 in the second ranging session 312 may be the same or nearly the same, as illustrated by line 320. The responder UEA cannot broadcast distinct PRSs to both ranging sessions 302 and 312 simultaneously, e.g. because the ranging session ID for the two ranging sessions is different and result in different PRS sequence ID. Accordingly, with the first PRS 306 and second PRS 316 assigned the same frequency channel and the same broadcast times, the responder UEA will not be able to broadcast the PRS signal at the assigned time for both ranging sessions.

Accordingly, in one implementation, if the responder UEA determines that the PRS assigned in multiple ranging sessions collide, the responder UEA may send a message (e.g., the pre-PRS response message 314 illustrated with the gray box labeled A) to the second initiator UEY indicating that there is a collision. In some implementations, the responder UEA may further provide an indication of an available time for PRS broadcast. The first initiator UEX will proceed with the first ranging session 302 and the second initiator UEY may proceed with the second ranging session 312, possibly without responder UEA, or may reconstruct the second ranging session with a new broadcast time for the second PRS for the responder UEA and send a new pre-PRS request message to the responder UEA with the new PRS broadcast time for the responder UEA.

Figure 4:
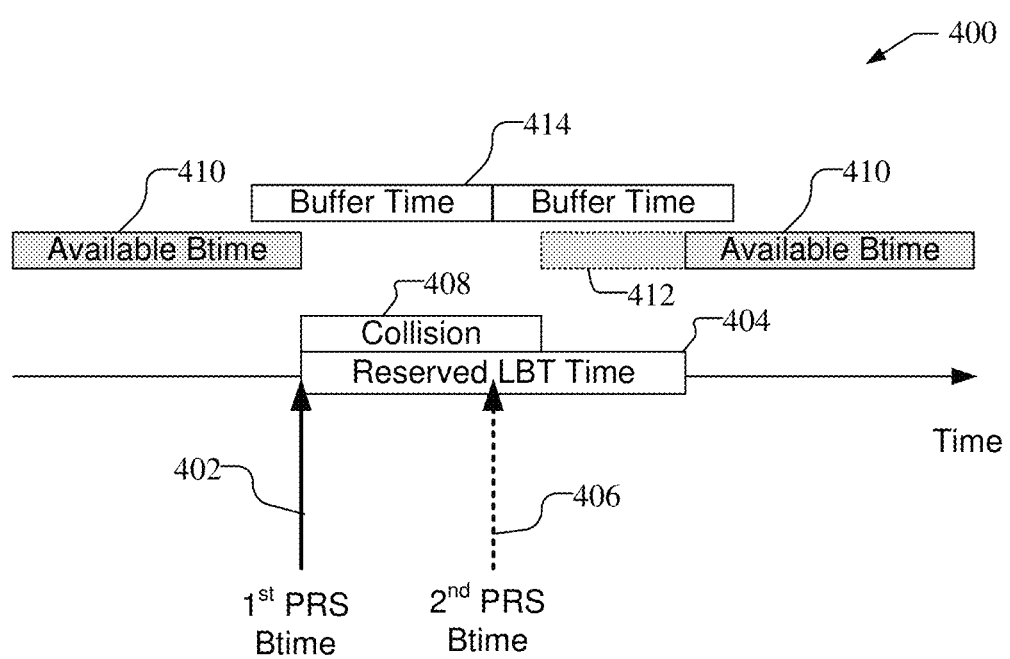
FIG. 4 is a graph illustrating the determination of a collision in PRS broadcast times and available broadcast times.

FIG. 4 is a graph 400 illustrating the determination by responder UEA of a collision in PRS broadcast times and available broadcast times. FIG. 4 illustrated along a timeline a first PRS broadcast time (Btime) (as indicated by arrow 402) and associated reserved LBT time 404 (or other predetermined delay time) along with a second PRS broadcast time (Btime) (as indicated by arrow 406). In some instances, for example, the first PRS broadcast time 402 and reserved LBT time 404 may be assigned by the first initiator UEX for the first PRS 306, e.g., assigned in the pre-PRS request message 304 illustrated with the white box labeled X in FIG. 3, and the second PRS broadcast time 406 may be assigned by the second initiator UEY for the second PRS 316, e.g., assigned in the pre-PRS request message 314 illustrated with the dark gray box labeled Y in shown in FIG. 3. However, in some instances, the second initiator UEY may assign the second PRS 316 with a broadcast time that is before the broadcast time assigned to the first PRS 306, in which case the first PRS broadcast time 402 and reserved LBT time 404 illustrated in FIG. 4 may correspond to the second PRS 316 shown in FIG. 3 and the second PRS broadcast time 406 may correspond to the first PRS 306 shown in FIG. 3. Nevertheless, for ease of reference, as discussed herein (unless otherwise indicated) the first PRS broadcast time 402 and reserved LBT time 404 in FIG. 4 corresponds to the first PRS 306 in FIG. 3 and the second PRS broadcast time 406 in FIG. 4 corresponds to the second PRS 316 in FIG. 3.

If the assigned frequencies for the PRS broadcasts for the multiple ranging sessions are the same, the responder UEA may determine that the PRS for the ranging sessions collide if the second PRS broadcast time 406 is within a predetermined amount of time from the first PRS broadcast time 402. FIG. 4, for example, illustrates the predetermined amount of time for determining a collision (sometimes referred to herein as collision threshold) with block 408. The collision threshold 408, for example, may be the full duration of the reserved LBT time 404 (or other predetermined delay time). Because the reserved LBT time is the maximum LBT time, it is likely that the first PRS will be broadcast before the end of the reserved LBT time 404, and accordingly, the predetermined collision threshold 408 may be less than the reserved LBT time 404 if desired.

As illustrated in FIG. 4, the second PRS broadcast time 40×6 falls within the collision threshold 408 from the first PRS broadcast time 402, and thus, the first PRS and second PRS are determined to collide. Thus, the responder UEA sends a message to the second initiator UEY indicating that the assigned PRS collides with another PRS. For example, referring to FIG. 3, the responder UEA may send the responding pre-PRS message 314 (illustrated with light gray box labeled A) to the second initiator UEY with a no acknowledgement (NACK) message to indicate that the assigned PRS collides with the PRS in another ranging session, but may send the responding pre-PRS message 304 to the first initiator UEX acknowledging the ranging session.

Additionally, the responder UEA may further determine a time that is available for broadcasting the second PRS and may provide an indication of the available time for the second PRS to the second initiator UEY. For example, as illustrated in FIG. 4, the responder UEA has time available for the second PRS before the first broadcast time 402 (illustrated with block 410) and after the reserved LBT time 404 (illustrated with block 412). In some implementations, the time between the collision threshold 408 and the end of the reserved LBT time 404 (if any) (e.g., illustrated with block 414) may be treated by the responder UEA as available time for the second PRS, although there is a chance that LBT for the first PRS will extend past the collision threshold 408. The responder UEA may provide the available time for broadcasting the second PRS to the second initiator UEY. For example, the responder UEA may define the available time based on an initial time of blocks 410 and 412 and their durations, by the start times and end times of the blocks 410 and 412, or may provide the first broadcast time 402 and optionally the reserved LBT time 404 (or the predetermined collision threshold 408), from which the initiator UEY can determine available times for broadcast of the PRS.

In some implementations, the responder UEA may not provide the available time initiator UEY and the initiator UEY may determine available times for PRS to be broadcast by the responder UEA based on the second PRS broadcast time 406.

Various actions are possible by the initiator UEY after receiving an indication of a PRS collision by responder UEA. For example, in one implementation, the initiator UEY may simply continue with the second ranging session with responder UEA and other responder UEs. If the responder UEA is able, it will broadcast the second PRS at the assigned second PRS broadcast time 406 (e.g., there is in fact no collision with the first PRS broadcast time 402 because the first PRS is broadcast before the second PRS broadcast time 406). Additionally, if the first PRS cannot be broadcast until after the second PRS broadcast time 406 but is broadcast before the reserved LBT time for the second PRS broadcast time, then the responder UEA may still broadcast the second PRS. It may be advantageous for the initiator UEY to proceed with the second ranging session, even if the responder UEA may not broadcast its PRS, for example, if there are many responder UEs and the initiator UEY does not need to presence of the PRS signal from responder UEA.

In another implementation, if the initiator UEY receives the available times for broadcast from the responder UEA, the initiator UEY may reconstruct the second ranging session to avoid the PRS collision, e.g., using a different second PRS broadcast time for the responder UEA that falls within the available broadcast times. The initiator UEY, for example, may send a new pre-PRS request message for the new second ranging session to all responder UEs. The new pre-PRS request message may include the same parameters as used in the original pre-PRS request message for the second ranging session but may include a new ranging session ID and the different second PRS broadcast time for the responder UEA (e.g., the PRS broadcast times for other responder UEs may not be changed).

In another implementation, the responder UEA may not send available times for broadcast and the initiator UEY may determine available times for PRS broadcast by the responder UEA without assistance from the responder UEA. For example, once the initiator UEY receives an indication of a PRS collision from the responder UA, the initiator UEY may estimate an available time for PRS broadcast by the responder UEA based on the initial second PRS broadcast time 406 and a buffer time 414 around the second PRS broadcast time 406. The buffer time 414, for example, may be a predetermined amount of time before and after the second PRS broadcast time 406 that the initiator UEY will assume that the responder UEA is not able to broadcast the second PRS, and thus, the initiator UEY may assume times outside of the buffer time 414 are available broadcast times for the responder UEA. The duration of the buffer time 414, for example, may be based on the reserved LBT time and/or a collision threshold after the second PRS broadcast time 406 and before the second PRS broadcast time 406. For example, the second initiator UEY may not know if the assigned second PRS 316 (shown in FIG. 3) is after or before the other colliding PRS, and accordingly, buffer time both before and after the second PRS broadcast time 406 is used.

Once the initiator UEY determines the available broadcast times for the responder UEA, the initiator UEY may reconstruct the second ranging session to avoid the PRS collision, e.g., using a different second PRS broadcast time for the responder UEA that falls within the available broadcast times. The initiator UEY, for example, may send a new pre-PRS request message for the new second ranging session to all responder UEs. The new pre-PRS request message may include the same parameters as used in the original pre-PRS request message for the second ranging session but may include a new ranging session ID and the different second PRS broadcast time for the responder UEA (e.g., the PRS broadcast times for other responder UEs may not be changed).

Figure 5:
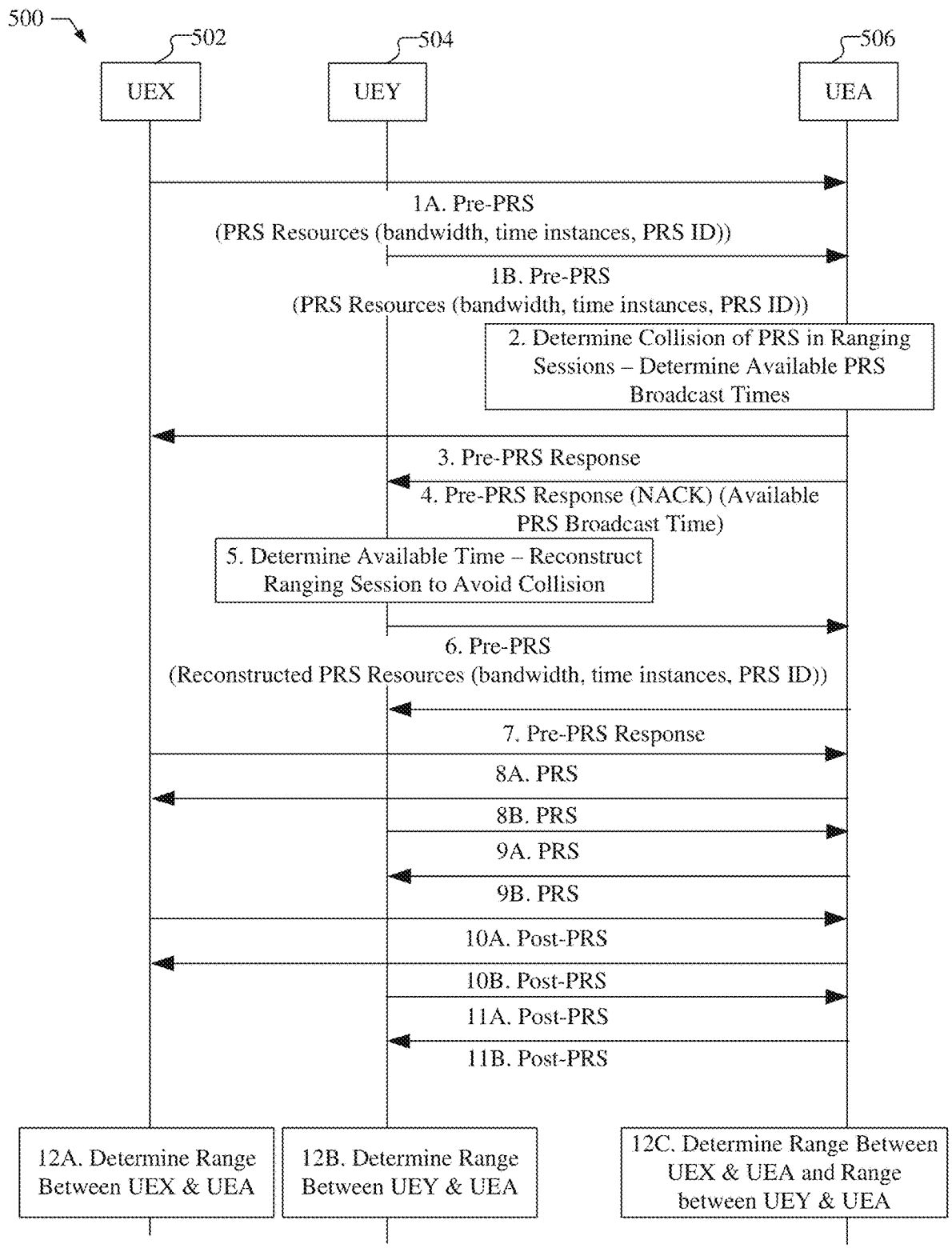
FIG. 5 illustrates a signaling flow for separate ranging sessions with colliding PRS broadcast times, where a ranging session is rescheduled.

FIG. 5 illustrates an example of a signaling flow 500 for separate ranging sessions initiated by a first initiator UEX 502 and a second initiator UEY 504 and that include responder UEA and colliding PRS broadcast times, where the second initiator UEY 504 rescheduling the second ranging session, as discussed herein. The initiator UEX 502, initiator UEY 504, and responder UEA 506 may be one or more of the vehicle based UEs (V-UE) 102 and 104, RSU 110 or UE 112, as described in FIG. 1. It should be understood that FIG. 5 illustrates the signaling for multiple ranging procedures involving only one responder UE, e.g., UEA 506, but that additional responder UEs may be present, which would involve additional communications similar to that shown in FIG. 5. As illustrated, the communications between the UEs 502, 504, and 506 in FIG. 5 may be direct communications between the entities and may not involve infrastructure devices, such as base stations, to forward the messages between the entities.

At stage 1A, the first initiator UEX 502 sends a pre-PRS message (pre-ranging message) to request a ranging session with responder UEA 506. The pre-PRS message may be transmitted via a licensed spectrum. The pre-PRS message may indicate ranging signal properties to be used by the responder UEA 506 (as well as the initiator UEX and any other responder UEs) in the ranging session with initiator UEX 502, such as a session ID and PRS resources, including frequency channel and timing instances including the PRS broadcast time and reserved LBT time (or other delay time), and PRS identifier (ID).

At stage 1B, the second initiator UEY 504 sends a pre-PRS message to request a ranging session with the responder UEA 506. The pre-PRS message of stage 1B is after the pre-PRS message of stage 1A, and thus, the ranging session initiated by the pre-PRS message in stage 1A is sometimes referred to as the first ranging sessions and the ranging session initiated by the pre-PRS message in stage 1B is sometimes referred to as the second ranging sessions. Similar to stage 1A, the pre-PRS message sent in stage 1B may be transmitted via a licensed spectrum and may indicate ranging signal properties to be used in the ranging session by the responder UEA 506 (as well as the initiator UEY 504 and any other responder UEs) in the second ranging session with initiator UEY 504, such as a session ID and PRS resources, including frequency channel and timing instances including the PRS broadcast time and reserved LBT time (or other delay time), and PRS identifier (ID).

At stage 2, the responder UEA 506 determines if a collision exists between the first PRS and second PRS assigned respectively in the first pre-PRS message of stage 1A and the second pre-PRS message of stage 1B. As discussed, e.g., in FIG. 4, a collision may be determined if the PRS signals for both ranging sessions are assigned the same frequency channels and if a second PRS broadcast time is within a predetermined amount of time (e.g., collision threshold) of the first PRS broadcast time. The duration of the collision threshold may be predetermined and, in some implementations, may be based on the approximate duration of a reserved LBT time (or other delay time), e.g., the collision threshold may be a percentage (e.g., 100%, 80%, 60%, etc.) of the reserved LBT time associated with the first PRS broadcast. Other considerations and factors may be used to determine the duration of the collision threshold. In some implementations, the responder UEA 506 may further determine the available times for PRS broadcast, as illustrated in FIG. 4. For example, the available times may be determined based on times before the first PRS broadcast time and after the reserved LBT time or after the collision threshold time.

At stage 3, the responder UEA 506 sends a pre-PRS message (pre-ranging message) to the first initiator UEX 502 in response to the pre-PRS request of stage 1A, acknowledging the request, thereby indicating that the responder UEA 506 accepts the request for the ranging session from initiator UEX 502. The pre-PRS message of stage 4A may be transmitted on a licensed spectrum.

At stage 4, the responder UEA 506 sends a pre-PRS message (pre-ranging message) to the second initiator UEY 504 in response to the pre-PRS request of stage 1B. Due to the collision of the second PRS assigned in the second pre-PRS message of stage 1B with the first PRS assigned in the first pre-PRS message of stage 1A, the responding pre-PRS message in stage 4 includes an indication of a PRS collision, e.g., using a no acknowledgement (NACK) message. In some implementations, the responder UEA 506 may include an indication of available PRS broadcast times in the pre-PRS message in stage 4. The indication of available PRS broadcast times, for example, may be the start and end times of the available times, the start times and durations of the available times, the first PRS broadcast time and optionally either the reserved LBT time or collision threshold duration, etc. The pre-PRS message of stage 4 may be transmitted on a licensed spectrum.

At stage 5, the initiator UEY 504 may determine the available PRS broadcast times for the responder UEA 506, e.g., from the available PRS broadcast time provided in the pre-PRS message of stage 4, or if the responder UEA 506 does not include the available PRS broadcast time provided in the pre-PRS message of stage 4 the initiator UEY 504 may determine the available time independently. For example, as discussed in FIG. 4, the initiator UEY 504 may use a buffer time before and after the assigned second PRS broadcast time to define times during which there may be a PRS collision for the responder UEA 506, and times outside of the buffer times may be determined to be available PRS broadcast times for the responder UEA 506. The initiator UEY 504 may reconstruct the second ranging session based on the available PRS broadcast time for the responder UEA 506.

At stage 6, the second initiator UEY 504 sends another pre-PRS message to request the second ranging session with the responder UEA 506. The pre-PRS message of stage 6 may be similar to the pre-PRS message of stage 1B (including ranging signal properties to be used in the ranging session by the initiator UEY 504 and any other responder UEs), but may include a new session ID and the reconstructed PRS resources for the responder UEA 506, including the frequency channel and new timing instances including the new PRS broadcast time and reserved LBT time (or other delay time), and PRS identifier (ID).

At stage 7, the responder UEA 506 sends a pre-PRS message (pre-ranging message) to the second initiator UEX 502 in response to the pre-PRS request of stage 6, acknowledging the request, thereby indicating that the responder UEA 506 accepts the request for the ranging session from the second initiator UEY 504. The pre-PRS message of stage 4A may be transmitted on a licensed spectrum.

At stage 8A, the first initiator UEX 502 broadcasts a PRS signal using a set of PRS resources that were identified in the pre-PRS message of stage 1A. The PRS signal may be broadcast on an unlicensed spectrum in order to use a wide frequency band. The first initiator UEX 502 records the ToD of the PRS signal and in some implementations the AoD of the PRS signal and the responder UEA 506 records the ToA of the PRS signal and in some implementations measures and records the AoA of the PRS signal.

At stage 8B, in response to receiving the PRS signal in stage 8A, the responder UEA 506 broadcasts a PRS signal using the PRS resources (including frequency channel, PRS broadcast time and reserved LBT time) assigned in the pre-PRS message of stage 1A. The PRS signal may be broadcast on an unlicensed spectrum in order to use a wide frequency band. The responder UEA 506 records the ToD of the PRS signal and in some implementations the AoD of the PRS signal and the first initiator UEX 502 records the ToA of the PRS signal and in some implementations measures and records the AoA of the PRS signal.

At stage 9A, the second initiator UEY 504 broadcasts a PRS signal using a set of PRS resources that were identified in the pre-PRS message of stage 6. The PRS signal may be broadcast on an unlicensed spectrum in order to use a wide frequency band. The second initiator UEY 504 records the ToD of the PRS signal and in some implementations the AoD of the PRS signal and the responder UEA 506 records the ToA of the PRS signal and in some implementations measures and records the AoA of the PRS signal.

At stage 9B, in response to receiving the PRS signal in stage 9A, the responder UEA 606 broadcasts a PRS signal using the PRS resources (including frequency channel, the revised PRS broadcast time and reserved LBT time) assigned in the pre-PRS message of stage 6. Because the PRS signal in stage 9B is broadcast using the revised PRS broadcast time, there is no collision with the PRS broadcast in stage 8B. The PRS signal in stage 9B may be broadcast on an unlicensed spectrum in order to use a wide frequency band. The responder UEA 506 records the ToD of the PRS signal and in some implementations the AoD of the PRS signal and the second initiator UEY 504 records the ToA of the PRS signal and in some implementations measures and records the AoA of the PRS signal.

At stage 10A, the first initiator UEX 502 sends a post-PRS message to the responder UEA 506 indicating the ToD, and in some implementations the AoD, of the PRS signal broadcast at stage 8A and indicating the ToA, and in some implementations the AoA, of the PRS signal received at stage 8B. If the position of the first initiator UEX 502 is known, the post-PRS message may further include a current position of the first initiator UEX 502.

At stage 10B, the responder UEA 506 sends a post-PRS message to the first initiator UEX 502 indicating the ToA, and in some implementations the AoA, of the PRS signal received at stage 8A and indicating the ToD, and in some implementations the AoD, of the PRS signal broadcast at stage 8B. If the position of the responder UEA 506 is known, the post-PRS message may further include a current position of the responder UEA 506.

At stage 11A, the second initiator UEY 504 sends a post-PRS message to the responder UEA 506 indicating the ToD, and in some implementations the AoD, of the PRS signal broadcast at stage 9A and indicating the ToA, and in some implementations the AoA, of the PRS signal received at stage 9B. If the position of the second initiator UEY 504 is known, the post-PRS message may further include a current position of the second initiator UEY 504.

At stage 11B, the responder UEA 506 sends a post-PRS message to the second initiator UEY 504 indicating the ToA, and in some implementations the AoA, of the PRS signal received at stage 9A and indicating the ToD, and in some implementations the AoD, of the PRS signal broadcast at stage 9B. If the position of the responder UEA 506 is known, the post-PRS message may further include a current position of the responder UEA 506.

At stage 12A, the first initiator UEX 502 may determine the range between UEX 502 and responder UEA 506 based on the ToD and ToA of the PRS signals broadcast in stages 8A and 8B. For example, the range may be determined based on the $ToD_i$ and $ToA_i$ for the $PRS_i$ signals (where i=1 for PRS broadcast by the initiator UEX 502 and i=2 for PRS broadcast by the responder UEA 506) as:

$$\text{Range} = \frac{(ToD_1 - ToA_2) - (ToA_1 - ToD_2)}{2c}. \qquad \text{eq. 2}$$

If the position of the responder UEA 506 is known, e.g., provided in post-PRS message in stage 10B, along with additional information, such as AoA or AoD of the PRS signals or positions and ranges for other responder UEs (not shown in FIG. 5), or geographic information, such as street locations, the position of the initiator UEX 502 may be determined using, e.g., multilateration and constraints pursuant to the AoA or AoD of the PRS signals and geographic information.

At stage 12B, the second initiator UEY 504 may determine the range between UEY 504 and responder UEA 506 based on the ToD and ToA of the PRS signals broadcast in stages 9A and 9B, in a manner similar to that described in stage 12A. The position of the initiator UEY 504 may also be determined in a manner similar to that described in stage 12A.

At stage 12C, the responder UEA 506 may determine the range between UEA 506 and the first initiator UEX 502 and the range between UEA 506 and second initiator UEY 504, based on the ToA and ToD of the PRS signals broadcast in stages 8A and 8B and broadcast in stages 9A and 9B, respectively, in a manner similar to that described in stages 12A and 12B. The position of the responder UEA 506 may also be determined in a manner similar to that described in stage 12A, e.g., based on positions of first initiator UEX 502 or second initiator UEY 504 if provided at stages 10A and 10B.

Figure 6:
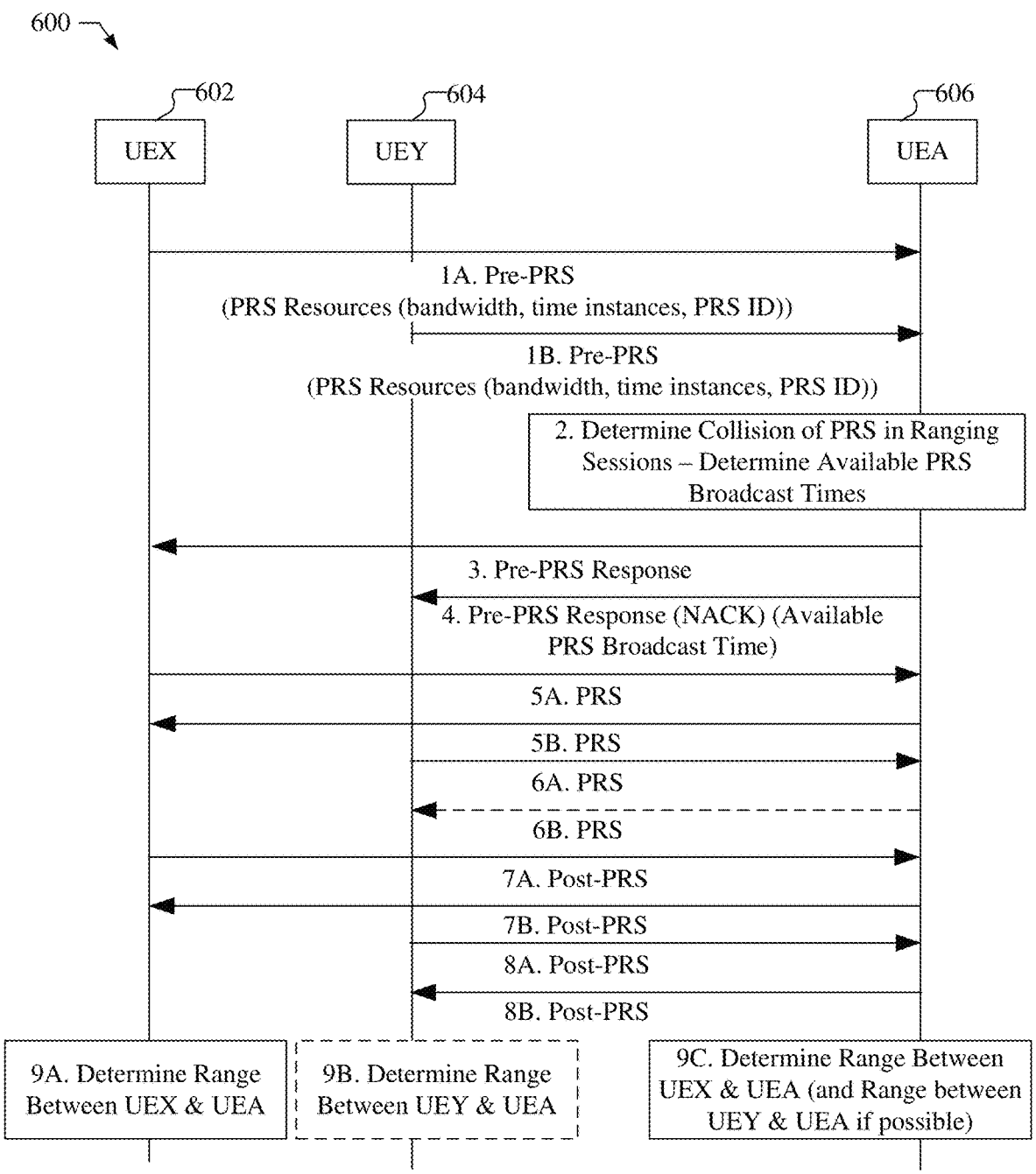
FIG. 6 illustrates a signaling flow for separate ranging sessions with colliding PRS broadcast times, without rescheduling the ranging sessions.

FIG. 6 illustrates an example of a signaling flow 600 for separate ranging sessions initiated by a first initiator UEX 602 and a second initiator UEY 604 and that include responder UEA and colliding PRS broadcast times, as discussed herein. The signaling flow 600 is similar to signaling flow 500 shown in FIG. 5, but the second initiator UEY 604 does not reschedule the second ranging session. The initiator UEX 602, initiator UEY 604, and responder UEA 606 may be one or more of the vehicle based UEs (V-UE) 102 and 104, RSU 110 or UE 112, as described in FIG. 1. It should be understood that FIG. 6 illustrates the signaling for multiple ranging procedures involving only one responder UE, e.g., UEA 606, but that additional responder UEs may be present, which would involve additional communications similar to that shown in FIG. 6. As illustrated, the communications between the UEs 602, 604, and 606 in FIG. 6 may be direct communications between the entities and may not involve infrastructure devices, such as base stations, to forward the messages between the entities.

At stage 1A, the first initiator UEX 602 sends a pre-PRS message (pre-ranging message) to request a ranging session with responder UEA 606. The pre-PRS message may be transmitted via a licensed spectrum. The pre-PRS message may indicate ranging signal properties to be used by the responder UEA 606 (as well as the initiator UEX and any other responder UEs) in the ranging session with initiator UEX 602, such as a session ID and PRS resources, including frequency channel and timing instances including the PRS broadcast time and reserved LBT time (or other delay time), and PRS identifier (ID).

At stage 1B, the second initiator UEY 604 sends a pre-PRS message to request a ranging session with the responder UEA 606. The pre-PRS message of stage 1B is after the pre-PRS message of stage 1A, and thus, the ranging session initiated by the pre-PRS message in stage 1A is sometimes referred to as the first ranging sessions and the ranging session initiated by the pre-PRS message in stage 1B is sometimes referred to as the second ranging sessions. Similar to stage 1A, the pre-PRS message sent in stage 1B may be transmitted via a licensed spectrum and may indicate ranging signal properties to be used in the ranging session by the responder UEA 606 (as well as the initiator UEY 604 and any other responder UEs) in the second ranging session with initiator UEY 604, such as a session ID and PRS resources, including frequency channel and timing instances including the PRS broadcast time and reserved LBT time (or other delay time), and PRS identifier (ID).

At stage 2, the responder UEA 606 determines if a collision exists between the first PRS and second PRS assigned respectively in the first pre-PRS message of stage 1A and the second pre-PRS message of stage 1B. As discussed, e.g., in FIG. 4, a collision may be determined if the PRS signals for both ranging sessions are assigned the same frequency channels and if a second PRS broadcast time is within a predetermined amount of time (e.g., collision threshold) of the first PRS broadcast time. The duration of the collision threshold may be predetermined and, in some implementations, may be based on the approximate duration of a reserved LBT time (or other delay time), e.g., the collision threshold may be a percentage (e.g., 100%, 80%, 60%, etc.) of the reserved LBT time associated with the first PRS broadcast. Other considerations and factors may be used to determine the duration of the collision threshold. In some implementations, the responder UEA 606 may further determine the available times for PRS broadcast, as illustrated in FIG. 4. For example, the available times may be determined based on times before the first PRS broadcast time and after the reserved LBT time or after the collision threshold time.

At stage 3, the responder UEA 606 sends a pre-PRS message (pre-ranging message) to the first initiator UEX 602 in response to the pre-PRS request of stage 1A, acknowledging the request, thereby indicating that the responder UEA 606 accepts the request for the ranging session from initiator UEX 602. The pre-PRS message of stage 4A may be transmitted on a licensed spectrum.

At stage 4, the responder UEA 606 sends a pre-PRS message (pre-ranging message) to the second initiator UEY 604 in response to the pre-PRS request of stage 1B. Due to the collision of the second PRS assigned in the second pre-PRS message of stage 1B with the first PRS assigned in the first pre-PRS message of stage 1A, the responding pre-PRS message in stage 4 includes an indication of a PRS collision, e.g., using a no acknowledgement (NACK) message. In some implementations, the responder UEA 606 may include an indication of available PRS broadcast times in the pre-PRS message in stage 4. The indication of available PRS broadcast times, for example, may be the start and end times of the available times, the start times and durations of the available times, the first PRS broadcast time and optionally either the reserved LBT time or collision threshold duration, etc. The pre-PRS message of stage 4 may be transmitted on a licensed spectrum.

As illustrated in the following, the initiator UEY 604 proceeds with the second ranging session without reconstructing the second ranging sessions to avoid the PRS collision by the responder UEA.

At stage 5A, the first initiator UEX 602 broadcasts a PRS signal using a set of PRS resources that were identified in the pre-PRS message of stage 1A. The PRS signal may be broadcast on an unlicensed spectrum in order to use a wide frequency band. The first initiator UEX 602 records the ToD of the PRS signal and in some implementations the AoD of the PRS signal and the responder UEA 606 records the ToA of the PRS signal and in some implementations measures and records the AoA of the PRS signal.

At stage 5B, in response to receiving the PRS signal in stage 5A, the responder UEA 606 broadcasts a PRS signal using the PRS resources (including frequency channel, PRS broadcast time and reserved LBT time) assigned in the pre-PRS message of stage 1A. The PRS signal may be broadcast on an unlicensed spectrum in order to use a wide frequency band. The responder UEA 606 records the ToD of the PRS signal and in some implementations the AoD of the PRS signal and the first initiator UEX 602 records the ToA of the PRS signal and in some implementations measures and records the AoA of the PRS signal.

At stage 6A, the second initiator UEY 604 broadcasts a PRS signal using a set of PRS resources that were identified in the pre-PRS message of stage 1B. The PRS signal may be broadcast on an unlicensed spectrum in order to use a wide frequency band. The second initiator UEY 604 records the ToD of the PRS signal and in some implementations the AoD of the PRS signal and the responder UEA 606 records the ToA of the PRS signal and in some implementations measures and records the AoA of the PRS signal.

At stage 6B, as illustrated with the dotted line, the responder UEA 606 may broadcast a PRS signal if possible, e.g., if the broadcast times for the PRS in stage 5B and stage 6B do not in fact collide. For example, if the PRS broadcast in stage 5B occurred prior to the scheduled broadcast time for the second PRS in stage 6B, the responder UEA 606 may broadcast the PRS signal using the PRS resources (including frequency channel, the revised PRS broadcast time and reserved LBT time) assigned in the pre-PRS message of stage 1B, otherwise, the responder UEA 606 will not broadcast the PRS signal. The initiator UEY 604, thus, will wait to receive the broadcast PRS signal. The PRS signal in stage 6B (if broadcast) may be broadcast on an unlicensed spectrum in order to use a wide frequency band. If the PRS signal is broadcast, the responder UEA 606 records the ToD of the PRS signal and in some implementations the AoD of the PRS signal and the second initiator UEY 604 records the ToA of the PRS signal and in some implementations measures and records the AoA of the PRS signal.

At stage 7A, the first initiator UEX 602 sends a post-PRS message to the responder UEA 606 indicating the ToD, and in some implementations the AoD, of the PRS signal broadcast at stage 5A and indicating the ToA, and in some implementations the AoA, of the PRS signal received at stage 5B. If the position of the first initiator UEX 602 is known, the post-PRS message may further include a current position of the first initiator UEX 602.

At stage 7B, the responder UEA 606 sends a post-PRS message to the first initiator UEX 602 indicating the ToA, and in some implementations the AoA, of the PRS signal received at stage 5A and indicating the ToD, and in some implementations the AoD, of the PRS signal broadcast at stage 5B. If the position of the responder UEA 606 is known, the post-PRS message may further include a current position of the responder UEA 606.

At stage 8A, the second initiator UEY 604 may send a post-PRS message to the responder UEA 606 indicating the ToD, and in some implementations the AoD, of the PRS signal broadcast at stage 6A and indicating whether the PRS in stage 6B was received, and if so, the ToA, and in some implementations the AoA, of the PRS signal received at stage 6B. If the position of the second initiator UEY 604 is known, the post-PRS message may further include a current position of the second initiator UEY 604.

At stage 8B, the responder UEA 606 may send a post-PRS message to the second initiator UEY 604 indicating the ToA, and in some implementations the AoA, of the PRS signal received at stage 6A and indicating whether the PRS in stage 6B was broadcast, and if so, the ToD, and in some implementations the AoD, of the PRS signal broadcast at stage 6B. If the position of the responder UEA 606 is known, the post-PRS message may further include a current position of the responder UEA 606.

At stage 9A, the first initiator UEX 602 may determine the range between UEX 602 and responder UEA 606 based on the ToD and ToA of the PRS signals broadcast in stages 5A and 5B. For example, the range may be determined based on the $ToD_i$ and $ToA_i$ for the $PRS_i$ signals (where i=1 for PRS broadcast by the initiator UEX 602 and i=2 for PRS broadcast by the responder UEA 606) as:

$$\text{Range} = \frac{(ToD_1 - ToA_2) - (ToA_1 - ToD_2)}{2c}. \quad \text{eq. 3}$$

If the position of the responder UEA 606 is known, e.g., provided in post-PRS message in stage 7B, along with additional information, such as AoA or AoD of the PRS signals or positions and ranges for other responder UEs (not shown in FIG. 6), or geographic information, such as street locations, the position of the initiator UEX 602 may be determined using, e.g., multilateration and constraints pursuant to the AoA or AoD of the PRS signals and geographic information.

At stage 9B, as indicated by the dotted lines, if the responder UEA broadcast the PRS in stage 6B, the second initiator UEY 604 may determine the range between UEY 604 and responder UEA 606 based on the ToD and ToA of the PRS signals broadcast in stages 6A and 6B, in a manner similar to that described in stage 9A. The position of the initiator UEY 604 may also be determined in a manner similar to that described in stage 9A. If the responder UEA 60 did not broadcast the PRS in stage 6B, the range between UEY 604 and responder UEA 606 is not determined, and the position of the second initiator UEY 604 would need to be determined without use of the range to the responder UEA 606.

At stage 9C, the responder UEA 606 may determine the range between UEA 606 and the first initiator UEX 602 and, if the if the responder UEA broadcast the PRS in stage 6B, the range between UEA 606 and second initiator UEY 604, based on the ToA and ToD of the PRS signals broadcast in stages 5A and 5B and broadcast in stages 6A and 6B, respectively, in a manner similar to that described in stages 9A and 9B. The position of the responder UEA 606 may also be determined in a manner similar to that described in stage 9A, e.g., based on positions of first initiator UEX 602 or second initiator UEY 604 if provided at stages 7A and 7B. If the responder UEA 606 did not broadcast the PRS in stage 6B, the range between responder UEA 606 and the second initiator UEY 604 is not determined, and the position of the responder UEA 606 would need to be determined without use of the range to the second initiator UEY 604.

Figure 7:
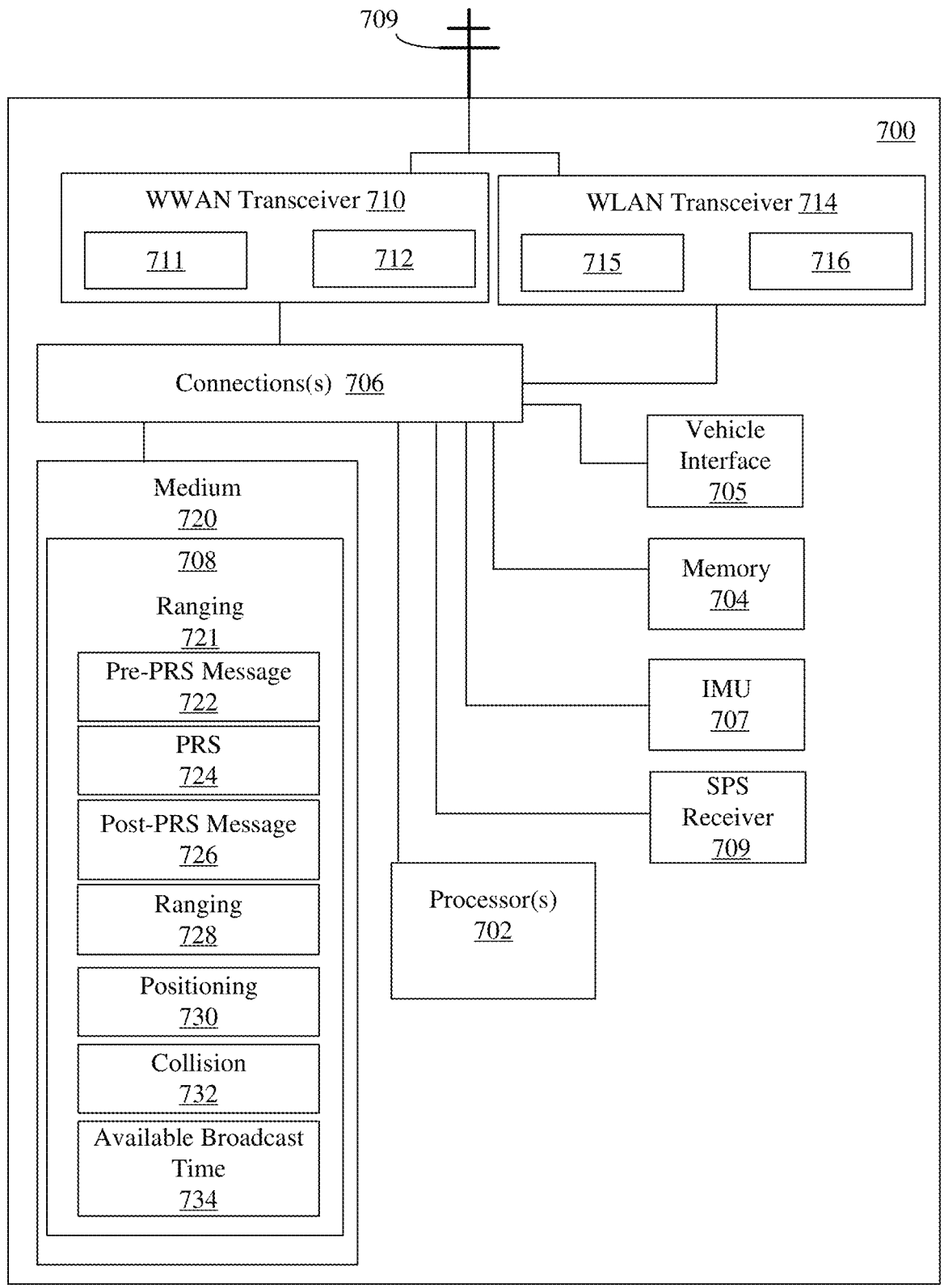
FIG. 7 shows a schematic block diagram illustrating certain exemplary features of a UE.

FIG. 7 shows a schematic block diagram illustrating certain exemplary features of a user equipment (UE) 700, which may be UE in vehicles 102 or 104, an RSU 110, or UE 112 held by a pedestrian 114, as illustrated in FIG. 1. The UE 700 may be configured to act as an initiator UE, e.g., UEY, or a responder UE, e.g., UEA during ranging sessions, as discussed herein. If the UE 700 is a V-UE, it may be configured to control the automated driving of a vehicle, e.g., vehicle 102. For example, the UE 700 may include a vehicle interface 705 with which commands are provided to the vehicle for automated driving and sensory input, including speed and acceleration, may be provided from the vehicle to UE 700. The UE 700 may, for example, include one or more processors 702, memory 704, an inertial measurement unit (IMU) 707 that may include, e.g., an accelerometer, gyroscope, magnetometers, etc., which may be used to detect orientation with respect to a global or local reference frame and the motion or one or more motion characteristics of the vehicle, a satellite positioning system (SPS) receiver 709 to determine, e.g., a GPS position, and an external interface including, e.g., a Wireless Wide Area Network (WWAN) transceiver 710, and a Wireless Local Area Network (WLAN) transceiver 714, which may be operatively coupled with one or more connections 706 (e.g., buses, lines, fibers, links, etc.) to non-transitory computer readable medium 720 and memory 704. The UE 700 may further include additional items, which are not shown, such as a user interface that may include e.g., a display, a keypad or other input device, such as virtual keypad on the display, through which a user may interface with the user device. In certain example implementations, all or part of UE 700 may take the form of a chipset, and/or the like.

Transceiver 710 may be, e.g., a cellular transceiver, that is configured to transmit and receive direct communications in the wireless network, as illustrated in FIG. 1. The transceiver 710 may include a transmitter 711 enabled to transmit one or more signals over one or more types of wireless communication networks and a receiver 712 to receive one or more signals transmitted over the one or more types of wireless communication networks. Transceiver 714 may be, e.g., a short-range transceiver, and may be configured to transmit and receive direct communications in the wireless network, as illustrated in FIG. 1. The transceiver 714 may include a transmitter 715 enabled to transmit one or more signals, including ranging signals (PRS signals) and pre-ranging (pre-PRS) and post-ranging (post-PRS) messages, and combine and separate messages, over one or more types of wireless communication networks and a receiver 716 to receive one or more signals, e.g., including PRS and pre-PRS and post-PRS messages, combine and separate messages, transmitted over the one or more types of wireless communication networks. The transceivers 710 and 714 enable the UE 700 to communicate with transportation entities using D2D communication links, such as DSRC, C-V2X, or 5G NR.

In some embodiments, UE 700 may include antenna 709, which may be internal or external. The antenna 709 may be used to transmit and/or receive signals processed by transceiver 710 and/or transceiver 714. In some embodiments, antenna 709 may be coupled to transceiver 710 and/or transceiver 714. In some embodiments, measurements of signals received (transmitted) by UE 700 may be performed at the point of connection of the antenna 709 and transceiver 710 and/or transceiver 714. For example, the measurement point of reference for received (transmitted) RF signal measurements may be an input (output) terminal of the receivers 712, 716 (transmitters 711, 715) and an output (input) terminal of the antenna 709. In a UE 700 with multiple antennas 709 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 700, e.g., based on the orientation of the UE 700 to the global or local reference frame as measured by the IMU 707.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of UE 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in UE 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in UE 700 is merely exemplary, and as such the functionality of the modules and/or data structures may be combined, separated, and/or be structured in different ways depending upon the implementation of the UE 700.

The medium 720 and/or memory 704 may include a ranging module 721 that when implemented by the one or more processors 702 configures the one or more processors 702 to participate in a ranging session as an initiator UE or a responder UE as discussed herein. The ranging module 721, for example, may include a pre-ranging module (pre-PRS message module 722), a ranging signal module (PRS module 724), a post-ranging module (post-PRS message module 726), and a range module 728.

The medium 720 and/or memory 704 may include a pre-PRS message module 722 that when implemented by the one or more processors 702 configures the one or more processors 702 to generate and transmit or receive pre-ranging messages, such as pre-PRS messages, via the transceiver 714, e.g., to initiate a ranging session or to accept a ranging session. The pre-PRS messages may be broadcast, multicast, or unicast (with RRC connection). In some implementations, the PRS messages may be transmitted and received over a licensed spectrum. The pre-PRS message may be an initiating pre-PRS message to initiate a ranging session or a responding pre-PRS message to acknowledge an initiating pre-PRS message or to indicate the presence of a PRS collision with another ranging session, e.g., with a no acknowledge (NACK) message. The pre-PRS messages may include identifiers for the initiating UE and one or more responder UEs for the positioning session, which may be monitored by the UE 700 over a plurality of ranging sessions. The participating UEs may be determined, e.g., from capabilities messages received by the UE 700 or from monitoring pre-PRS messages broadcast by multiple initiator UEs over a period of time. The pre-PRS messages may include a session ID, and ranging signal resources for participating UE, including a time and frequencies for responder UEs to broadcast ranging (PRS) signal in the ranging session, PRS ID, etc. The time resource, for example, may be a PRS broadcast time and reserved LBT time (e.g., maximum LBT time) or another delay time. A responding pre-PRS message from a responder UE that indicates the presence of a PRS collision with another ranging session may further include available PRS broadcast times.

The medium 720 and/or memory 704 may include a PRS module 724 that when implemented by the one or more processors 702 configures the one or more processors 702 to broadcast and receive a ranging signal to and from other UEs in the ranging session, via the transceiver 714, as discussed herein. The ranging signal, for example, may be a PRS signal, such as a Quadrature Phase Shift Keying (QPSK) modulated pseudo-noise (PN) sequence as discussed herein. The ranging signal may be broadcast at the assigned broadcast time, e.g., after a LBT procedure using the reserved LBT time, and with the PRS identifier and at the frequencies indicated over the pre-PRS message. The ranging signal may be broadcast and received over unlicensed spectrum and may be broadcast pursuant to category 2 or category 4 LBT constraints. The one or more processors 702, for example, may be configured to measure the ToD of broadcast ranging signals and the ToA of received ranging signals, and may be configured to measure the AoD of broadcast ranging signals and the AoA of received ranging signals.

The medium 720 and/or memory 704 may include a post-PRS message module 726 that when implemented by the one or more processors 702 configures the one or more processors 702 to send and receive post-ranging messages to and from other UEs in the ranging session, via the transceiver 714, as discussed herein. The post-PRS messages that may include, e.g., an indication of the ToD, and in some implementations the AoD, of the broadcast ranging signals and an indication of the ToA, and in some implementations the AoA, of the received ranging signals. In some implementation, the indication of the ToD and ToA may be a difference between the ToD and ToA. In some implementations, the post-PRS messages may include an indication of the position of the UE, e.g., if the UE is an anchor UE used for positioning another UE.

The medium 720 and/or memory 704 may include a range module 728 that when implemented by the one or more processors 702 configures the one or more processors 702 to determine a range to other UEs based on the ToD and ToA of broadcast and received ranging signals as measured by the UE 700 and received in the post-PRS messages from other UEs.

The medium 720 and/or memory 704 may include a position module 730 that when implemented by the one or more processors 702 configures the one or more processors 702 to determine a position for the UE 700, e.g., based on one or more ranges to broadcasting UEs and their location information using multilateration or other appropriate techniques discussed herein. For example, the one or more processors 702 may implement a Kalman filter or Extended Kalman filter to determine the position of the UE 700.

The medium 720 and/or memory 704 may include a collision module 732 that when implemented by the one or more processors 702 configures the one or more processors 702 to determine if there is a PRS collision in multiple ranging sessions. The collision may be determined based on PRS for two separate ranging sessions using the same time and frequency resources. For example, the one or more processors 702 may be configured to the presence of a collision between a first PRS signal and a second PRS signal if the time to broadcast the second PRS signal is within a predetermined amount of time from the time to broadcast the first PRS signal. The predetermined amount of time, for example, may be a predetermined maximum wait time for a LBT procedure or a predetermined collision threshold time, e.g., as discussed in FIG. 4.

The medium 720 and/or memory 704 may include an available broadcast time 734 that when implemented by the one or more processors 702 configures the one or more processors 702 to determine an available time for the responder UE to broadcast PRS when a PRS collision has been detected. For example, when a collision between a first PRS signal and a second PRS signal has been detected, the available time to broadcast the second PRS signal may be determined based on the time to broadcast the first PRS signal. The available time to broadcast, for example, may be determined based on a predetermined maximum wait time for a LBT procedure or based on a predetermined collision threshold time, e.g., as discussed in FIG. 4. If the UE 700 is the initiator UE, the one or more processors 702 may be configured to determine the available time to broadcast the PRS by a responder UE based on an available time to broadcast received from the responder UE in the pre-PRS message. If the available time to broadcast is not received from the responder UE, the one or more processors 702 may be configured to determine the available time to broadcast the PRS by a responder UE based on the initial broadcast time for the PRS signal and a predetermined time period. The predetermined time period, for example, may be based on a maximum wait time for a LBT procedure for broadcasting the PRS signal or a predetermined collision threshold time period.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program 708. For example, the non-transitory computer readable medium including program code 708 stored thereon may include program code 708 to support multiple ranging sessions including determining the presence of a PRS collision and to provide an indication of such to an initiator UE, which may initiate a new ranging session based on the available PRS broadcast time for the responder UE, in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random-access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable code 708 stored thereon, which if executed by one or more processors 702 may be operatively enabled to perform all or portions of the example operations as described herein. Computer readable medium 720 may be a part of memory 704.

Figure 8:
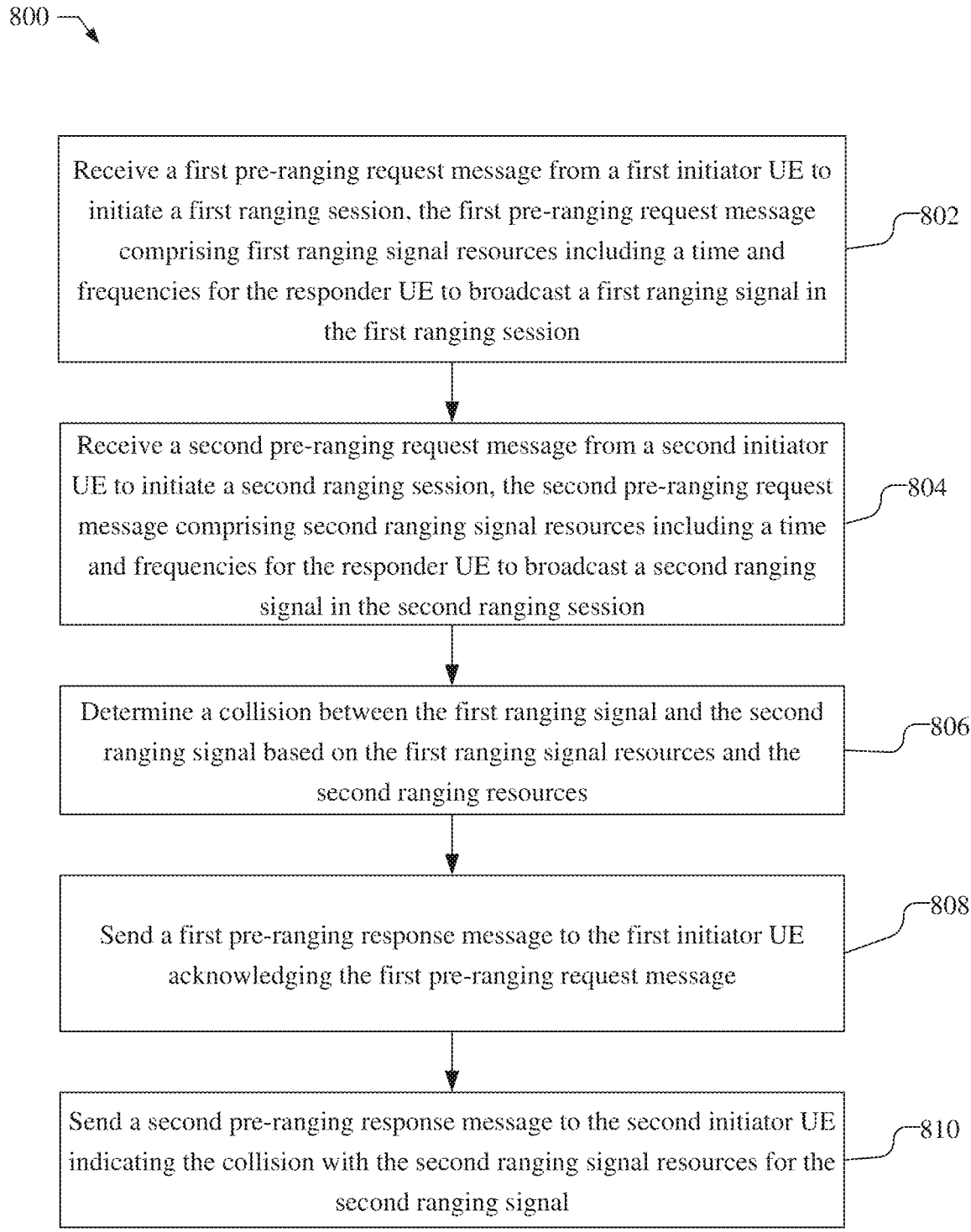
FIG. 8 is a flow chart illustrating a method of ranging between UEs implemented by a responder UE.

FIG. 8 is a flow chart 800 illustrating a method of ranging in a distributed system of user equipment (UE) performed by a responder UE, such as UEA in FIGS. 3, 5, 6, or UE 700 in FIG. 7.

At block 802, the responder UE receives a first pre-ranging request message from a first initiator UE to initiate a first ranging session, the first pre-ranging request message comprising first ranging signal resources including a time and frequencies for the responder UE to broadcast a first ranging signal in the first ranging session, e.g., as discussed at stage 1A in FIGS. 5 and 6. A means for receiving a first pre-ranging request message from a first initiator UE to initiate a first ranging session, the first pre-ranging request message comprising first ranging signal resources including a time and frequencies for the responder UE to broadcast a first ranging signal in the first ranging session may be, e.g., the transceiver 714 and the one or more processors 702 with dedicated hardware or implementing executable code or software instructions in memory 704 and/or medium 720, such as the ranging module 721 and the pre-PRS message module 722.

At block 804, the responder UE receives a second pre-ranging request message from a second initiator UE to initiate a second ranging session, the second pre-ranging request message comprising second ranging signal resources including a time and frequencies for the responder UE to broadcast a second ranging signal in the second ranging session, e.g., as discussed at stage 1B in FIGS. 5 and 6. A means for receiving a second pre-ranging request message from a second initiator UE to initiate a second ranging session, the second pre-ranging request message comprising second ranging signal resources including a time and frequencies for the responder UE to broadcast a second ranging signal in the second ranging session may be, e.g., the transceiver 714 and the one or more processors 702 with dedicated hardware or implementing executable code or software instructions in memory 704 and/or medium 720, such as the ranging module 721 and the pre-PRS message module 722.

At block 806, the responder UE determines a collision between the first ranging signal and the second ranging signal based on the first ranging signal resources and the second ranging resources, e.g., as discussed at stage 2 in FIGS. 5 and 6. A means for determining a collision between the first ranging signal and the second ranging signal based on the first ranging signal resources and the second ranging resources may be, e.g., the one or more processors 702 with dedicated hardware or implementing executable code or software instructions in memory 704 and/or medium 720, such as the collision module 732.

At block 808, the responder UE sends a first pre-ranging response message to the first initiator UE acknowledging the first pre-ranging request message, e.g., as discussed at stage 3 in FIGS. 5 and 6. A means for sending a first pre-ranging response message to the first initiator UE acknowledging the first pre-ranging request message may be, e.g., the transceiver 714 and the one or more processors 702 with dedicated hardware or implementing executable code or software instructions in memory 704 and/or medium 720, such as the ranging module 721 and the pre-PRS message module 722.

At block 810, the responder UE sends a second pre-ranging response message to the second initiator UE indicating the collision with the second ranging signal resources for the second ranging signal, e.g., as discussed at stage 4 in FIGS. 5 and 6. A means for sending a second pre-ranging response message to the second initiator UE indicating the collision with the second ranging signal resources for the second ranging signal may be, e.g., the transceiver 714 and the one or more processors 702 with dedicated hardware or implementing executable code or software instructions in memory 704 and/or medium 720, such as the ranging module 721 and the pre-PRS message module 722 and the collision module 732.

By way of example, in some implementations, the responder UE may determine the collision between the first ranging signal and the second ranging signal by determining that the time to broadcast the second ranging signal is within a predetermined amount of time of the time to broadcast the first ranging signal, e.g., as discussed in FIG. 4 and at stage 2 of FIGS. 5 and 6. For example, the predetermined amount of time may be a predetermined maximum wait time for a listen-before-transmit procedure for broadcasting the second ranging signal. In another example, the predetermined amount of time may be a predetermined collision threshold time. A means for determining that the time to broadcast the second ranging signal is within a predetermined amount of time of the time to broadcast the first ranging signal may be, e.g., the one or more processors 702 with dedicated hardware or implementing executable code or software instructions in memory 704 and/or medium 720, such as the collision module 732. Additionally, the responder UE may determine the collision between the first ranging signal and the second ranging signal by determining that the frequencies to broadcast the second ranging signal and the frequencies to broadcast the first ranging signal are the same, signal, e.g., as discussed in FIG. 4 and at stage 2 of FIGS. 5 and 6. A means for determining that the frequencies to broadcast the second ranging signal and the frequencies to broadcast the first ranging signal are the same may be, e.g., the one or more processors 702 with dedicated hardware or implementing executable code or software instructions in memory 704 and/or medium 720, such as the collision module 732.

In some implementations, the responder UE may further determine an available time to broadcast the second ranging signal, wherein the second pre-ranging response message includes the available time to broadcast the second ranging signal, e.g., as discussed in FIG. 4 and at stage 2 of FIGS. 5 and 6. The available time to broadcast the second ranging signal may be based on the time to broadcast the first ranging signal included in the first ranging signal resources. In one example, the available time to broadcast the second ranging signal may be further based on a predetermined maximum wait time for a listen-before-transmit procedure for broadcasting the first ranging signal. In another example, the available time to broadcast the second ranging signal may be further based on a predetermined collision threshold time A means for determining an available time to broadcast the second ranging signal, wherein the second pre-ranging response message includes the available time to broadcast the second ranging signal may be, e.g., the one or more processors 702 with dedicated hardware or implementing executable code or software instructions in memory 704 and/or medium 720, such as the available broadcast time module 734.

In one implementation, the responder UE may receive a third pre-ranging request message from the second initiator UE to initiate the second ranging session, the third pre-ranging request message comprising third ranging signal resources including a time and frequencies for the responder UE to broadcast the second ranging signal in the second ranging session, e.g., as discussed at stage 6 in FIG. 5. A means for receiving a third pre-ranging request message from the second initiator UE to initiate the second ranging session, the third pre-ranging request message comprising third ranging signal resources including a time and frequencies for the responder UE to broadcast the second ranging signal in the second ranging session may be, e.g., the transceiver 714 and the one or more processors 702 with dedicated hardware or implementing executable code or software instructions in memory 704 and/or medium 720, such as the ranging module 721 and the pre-PRS message module 722. The responder UE may perform the first ranging session with the first initiator UE comprising broadcasting the first ranging signal according to the first ranging signal resources, e.g., as discussed at stage 8B in FIG. 5, and may perform the second ranging session with the second initiator UE comprising broadcasting the second ranging signal according to the third ranging signal resources, e.g., as discussed at stage 9B in FIG. 5. A means for performing the first ranging session with the first initiator UE comprising broadcasting the first ranging signal according to the first ranging signal resources, and a means for performing the second ranging session with the second initiator UE comprising broadcasting the second ranging signal according to the third ranging signal resources may be, e.g., the transceiver 714 and the one or more processors 702 with dedicated hardware or implementing executable code or software instructions in memory 704 and/or medium 720, such as the ranging module 721 and the PRS module 724.

Figure 9:
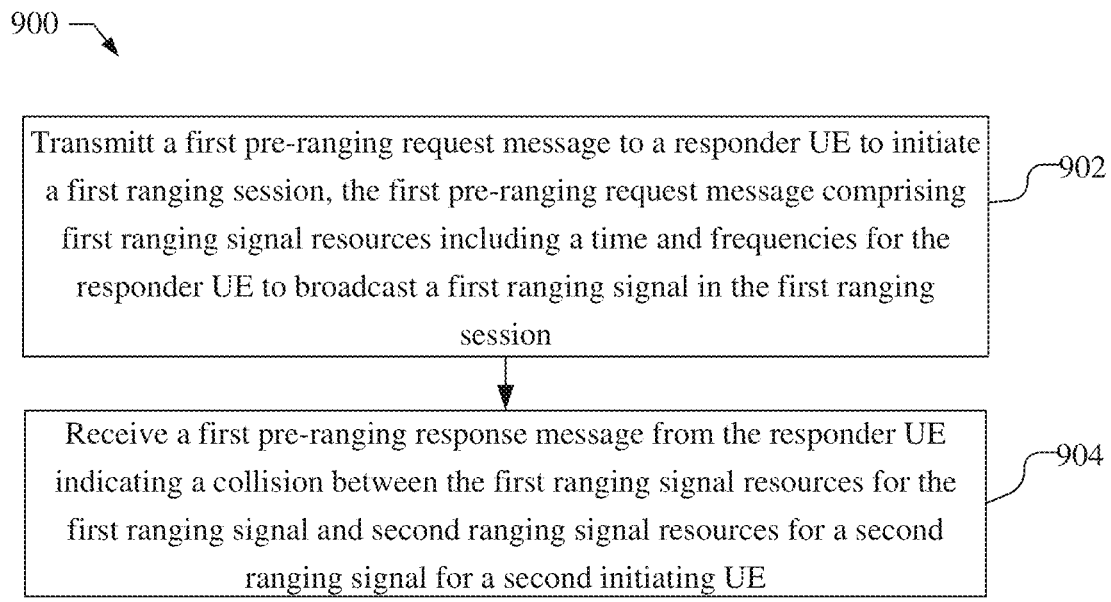
FIG. 9 is a flow chart illustrating a method of ranging between UEs implemented by an initiator UE.

FIG. 9 is a flow chart 900 illustrating a method of ranging in a distributed system of user equipment (UE) performed by an initiator UE, such as UEY in FIGS. 3, 5, 6, or UE 700 in FIG. 7.

At block 902, the initiator UE transmits a first pre-ranging request message to a responder UE to initiate a first ranging session, the first pre-ranging request message comprising first ranging signal resources including a time and frequencies for the responder UE to broadcast a first ranging signal in the first ranging session, e.g., as discussed at stage 1B in FIGS. 5 and 6. A means for transmitting a first pre-ranging request message to a responder UE to initiate a first ranging session, the first pre-ranging request message comprising first ranging signal resources including a time and frequencies for the responder UE to broadcast a first ranging signal in the first ranging session may be, e.g., the transceiver 714 and the one or more processors 702 with dedicated hardware or implementing executable code or software instructions in memory 704 and/or medium 720, such as the ranging module 721 and the pre-PRS message module 722.

At block 904, the initiator UE receives a first pre-ranging response message from the responder UE indicating a collision between the first ranging signal resources for the first ranging signal and second ranging signal resources for a second ranging signal for a second initiator UE, e.g., as discussed at stage 4 in FIGS. 5 and 6. A means for receiving a first pre-ranging response message from the responder UE indicating a collision between the first ranging signal resources for the first ranging signal and second ranging signal resources for a second ranging signal for a second initiator UE may be, e.g., the transceiver 714 and the one or more processors 702 with dedicated hardware or implementing executable code or software instructions in memory 704 and/or medium 720, such as the ranging module 721 and the pre-PRS message module 722.

In some implementations, the initiator UE may further determine an available time for the responder UE to broadcast the first ranging signal, e.g., as discussed in FIG. 4 and at stage 5 of FIG. 5. For example, the first pre-ranging response message may comprise the available time for the responder UE to broadcast the first ranging signal. In another example, the available time for the responder UE to broadcast the first ranging signal may be determined based on the time to broadcast the first ranging signal included in the first ranging signal resources and a predetermined time period. The predetermined time period, for example, may be based on a maximum wait time for a listen-before-transmit procedure for broadcasting the first ranging signal or a predetermined collision threshold time period. A means for determining an available time for the responder UE to broadcast the first ranging signal may be, e.g., the one or more processors 702 with dedicated hardware or implementing executable code or software instructions in memory 704 and/or medium 720, such as the available broadcast time module 734. The initiator UE may transmit a second pre-ranging request message to the responder UE to initiate the first ranging session, the second pre-ranging request message comprising third ranging signal resources including a time and frequencies for the responder UE to broadcast the first ranging signal in the first ranging session based on the available time, e.g., as discussed at stage 6 of FIG. 5. A means for transmitting a second pre-ranging request message to the responder UE to initiate the first ranging session, the second pre-ranging request message comprising third ranging signal resources including a time and frequencies for the responder UE to broadcast the first ranging signal in the first ranging session based on the available time may be, e.g., the one or more processors 702 with dedicated hardware or implementing executable code or software instructions in memory 704 and/or medium 720, such as the ranging module 721 and the pre-PRS message module 722.

In some implementations, the initiator UE may further receive a second pre-ranging response message from the responder UE acknowledging the second pre-ranging request message, e.g., as discussed at stage 7 of FIG. 5, and may perform the first ranging session with responder UE comprising receiving the first ranging signal transmitted by the responder UE according to the third ranging signal resources, e.g., as discussed at stage 9B of FIG. 5. A means for receiving a second pre-ranging response message from the responder UE acknowledging the second pre-ranging request message may be, e.g., the transceiver 714 and the one or more processors 702 with dedicated hardware or implementing executable code or software instructions in memory 704 and/or medium 720, such as the ranging module 721 and the pre-PRS message module 722. A means for performing the first ranging session with responder UE comprising receiving the first ranging signal transmitted by the responder UE according to the third ranging signal resources may be, e.g., the transceiver 714 and the one or more processors 702 with dedicated hardware or implementing executable code or software instructions in memory 704 and/or medium 720, such as the ranging module 721 and the PRS module 724.

In some implementations, the initiator UE may perform the first ranging session with responder UE by transmitting an initial ranging signal and waiting to receive the first ranging signal transmitted by the responder UE according to the first ranging signal resources, e.g., as discussed at stages 6A and 6B in FIG. 6. A means for performing the first ranging session with responder UE comprising transmitting an initial ranging signal and waiting to receive the first ranging signal transmitted by the responder UE according to the first ranging signal resources may be, e.g., the transceiver 714 and the one or more processors 702 with dedicated hardware or implementing executable code or software instructions in memory 704 and/or medium 720, such as the ranging module 721 and the PRS module 724.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method of ranging between user equipments (UEs) performed by a responder UE, the method comprising:

receiving a first pre-ranging request message from a first initiator UE to initiate a first ranging session, the first pre-ranging request message comprising first ranging signal resources including a time and frequencies for the responder UE to broadcast a first ranging signal in the first ranging session;

receiving a second pre-ranging request message from a second initiator UE to initiate a second ranging session, the second pre-ranging request message comprising second ranging signal resources including a time and frequencies for the responder UE to broadcast a second ranging signal in the second ranging session;

determining a collision between the first ranging signal and the second ranging signal based on the first ranging signal resources and the second ranging resources;

sending a first pre-ranging response message to the first initiator UE acknowledging the first pre-ranging request message; and sending a second pre-ranging response message to the second initiator UE indicating the collision with the second ranging signal resources for the second ranging signal.

2. The method of clause 1, wherein determining the collision between the first ranging signal and the second ranging signal comprises determining that the time to broadcast the second ranging signal is within a predetermined amount of time of the time to broadcast the first ranging signal.

3. The method of clause 2, wherein the predetermined amount of time is a predetermined maximum wait time for a listen-before-transmit procedure for broadcasting the second ranging signal.

4. The method of clause 2, wherein the predetermined amount of time is a predetermined collision threshold time.

5. The method of any of clauses 2-4, wherein determining the collision between the first ranging signal and the second ranging signal comprises determining that the frequencies to broadcast the second ranging signal and the frequencies to broadcast the first ranging signal are the same.

6. The method of any of clauses 1-5, further comprising determining an available time to broadcast the second ranging signal, wherein the second pre-ranging response message includes the available time to broadcast the second ranging signal.

7. The method of clause 6, wherein the available time to broadcast the second ranging signal is based on the time to broadcast the first ranging signal included in the first ranging signal resources.

8. The method of clause 7, wherein the available time to broadcast the second ranging signal is further based on a predetermined maximum wait time for a listen-before-transmit procedure for broadcasting the first ranging signal.

9. The method of clause 7, wherein the available time to broadcast the second ranging signal is further based on a predetermined collision threshold time.

10. The method of any of clauses 1-9, further comprising receiving a third pre-ranging request message from the second initiator UE to initiate the second ranging session, the third pre-ranging request message comprising third ranging signal resources including a time and frequencies for the responder UE to broadcast the second ranging signal in the second ranging session.

11. The method of clause 10, further comprising:
performing the first ranging session with the first initiator UE comprising broadcasting the first ranging signal according to the first ranging signal resources; and
performing the second ranging session with the second initiator UE comprising broadcasting the second ranging signal according to the third ranging signal resources.

12. A responder user equipment configured for ranging between UEs, the responder UE comprising:
a wireless transceiver configured to wirelessly communicate with entities in a wireless network;
at least one memory; and
at least one processor coupled to the wireless transceiver and the at least one memory, wherein the at least one processor is configured to:
receive a first pre-ranging request message from a first initiator UE to initiate a first ranging session, the first pre-ranging request message comprising first ranging signal resources including a time and frequencies for the responder UE to broadcast a first ranging signal in the first ranging session;
receive a second pre-ranging request message from a second initiator UE to initiate a second ranging session, the second pre-ranging request message comprising second ranging signal resources including a time and frequencies for the responder UE to broadcast a second ranging signal in the second ranging session;
determine a collision between the first ranging signal and the second ranging signal based on the first ranging signal resources and the second ranging resources;
send a first pre-ranging response message to the first initiator UE acknowledging the first pre-ranging request message; and
send a second pre-ranging response message to the second initiator UE indicating the collision with the second ranging signal resources for the second ranging signal.

13. The responder UE of clause 12, wherein the at least one processor is configured to determine the collision between the first ranging signal and the second ranging signal by being configured to determine that the time to broadcast the second ranging signal is within a predetermined amount of time of the time to broadcast the first ranging signal.

14. The responder UE of clause 13, wherein the predetermined amount of time is a predetermined maximum wait time for a listen-before-transmit procedure for broadcasting the second ranging signal.

15. The responder UE of clause 13, wherein the predetermined amount of time is a predetermined collision threshold time.

16. The responder UE of any of clauses 13-15, wherein the at least one processor is configured to determine the collision between the first ranging signal and the second ranging signal by being configured to determine that the frequencies to broadcast the second ranging signal and the frequencies to broadcast the first ranging signal are the same.

17. The responder UE of any of clauses 12-16, wherein the at least one processor is further configured to determine an available time to broadcast the second ranging signal, wherein the second pre-ranging response message includes the available time to broadcast the second ranging signal.

18. The responder UE of clause 17, wherein the available time to broadcast the second ranging signal is based on the time to broadcast the first ranging signal included in the first ranging signal resources.

19. The responder UE of clause 18, wherein the available time to broadcast the second ranging signal is further based on a predetermined maximum wait time for a listen-before-transmit procedure for broadcasting the first ranging signal.

20. The responder UE of clause 18, wherein the available time to broadcast the second ranging signal is further based on a predetermined collision threshold time.

21. The responder UE of any of clauses 12-20, wherein the at least one processor is further configured to receive a third pre-ranging request message from the second initiator UE to initiate the second ranging session, the third pre-ranging request message comprising third ranging signal resources including a time and frequencies for the responder UE to broadcast the second ranging signal in the second ranging session.

22. The responder UE of clause 21, wherein the at least one processor is further configured to:
perform the first ranging session with the first initiator UE by being configured to broadcast the first ranging signal according to the first ranging signal resources; and
perform the second ranging session with the second initiator UE by being configured to broadcast the second ranging signal according to the third ranging signal resources.

23. A responder user equipment configured for ranging between UEs, the responder UE comprising:
means for receiving a first pre-ranging request message from a first initiator UE to initiate a first ranging session, the first pre-ranging request message comprising first ranging signal resources including a time and frequencies for the responder UE to broadcast a first ranging signal in the first ranging session;
means for receiving a second pre-ranging request message from a second initiator UE to initiate a second ranging session, the second pre-ranging request message comprising second ranging signal resources including a time and frequencies for the responder UE to broadcast a second ranging signal in the second ranging session;
means for determining a collision between the first ranging signal and the second ranging signal based on the first ranging signal resources and the second ranging resources;
means for sending a first pre-ranging response message to the first initiator UE acknowledging the first pre-ranging request message; and
means for sending a second pre-ranging response message to the second initiator UE indicating the collision with the second ranging signal resources for the second ranging signal.

24. The responder UE of clause 23, wherein the means for determining the collision between the first ranging signal and the second ranging signal means for determining that the time to broadcast the second ranging signal is within a predetermined amount of time of the time to broadcast the first ranging signal.

25. The responder UE of clause 24, wherein the predetermined amount of time is a predetermined maximum wait time for a listen-before-transmit procedure for broadcasting the second ranging signal.

26. The responder UE of clause 24, wherein the predetermined amount of time is a predetermined collision threshold time.

27. The responder UE of any of clauses 24-26, wherein means for determining the collision between the first ranging signal and the second ranging signal means for determining that the frequencies to broadcast the second ranging signal and the frequencies to broadcast the first ranging signal are the same.

28. The responder UE of any of clauses 23-27, further comprising means for determining an available time to broadcast the second ranging signal, wherein the second pre-ranging response message includes the available time to broadcast the second ranging signal.

29. The responder UE of clause 28, wherein the available time to broadcast the second ranging signal is based on the time to broadcast the first ranging signal included in the first ranging signal resources.

30. The responder UE of clause 29, wherein the available time to broadcast the second ranging signal is further based on a predetermined maximum wait time for a listen-before-transmit procedure for broadcasting the first ranging signal.

31. The responder UE of clause 29, wherein the available time to broadcast the second ranging signal is further based on a predetermined collision threshold time.

32. The responder UE of any of clauses 23-31, further comprising means for receiving a third pre-ranging request message from the second initiator UE to initiate the second ranging session, the third pre-ranging request message comprising third ranging signal resources including a time and frequencies for the responder UE to broadcast the second ranging signal in the second ranging session.

33. The responder UE of clause 32, further comprising:
means for performing the first ranging session with the first initiator UE comprising broadcasting the first ranging signal according to the first ranging signal resources; and
means for performing the second ranging session with the second initiator UE comprising broadcasting the second ranging signal according to the third ranging signal resources.

34. A non-transitory storage medium including program code stored thereon, the program code is operable to configure at least one processor in a responder user equipment for ranging between UEs, the responder UE the program code comprising instructions to:
receive a first pre-ranging request message from a first initiator UE to initiate a first ranging session, the first pre-ranging request message comprising first ranging signal resources including a time and frequencies for the responder UE to broadcast a first ranging signal in the first ranging session;
receive a second pre-ranging request message from a second initiator UE to initiate a second ranging session, the second pre-ranging request message comprising second ranging signal resources including a time and frequencies for the responder UE to broadcast a second ranging signal in the second ranging session;
determine a collision between the first ranging signal and the second ranging signal based on the first ranging signal resources and the second ranging resources;
send a first pre-ranging response message to the first initiator UE acknowledging the first pre-ranging request message; and
send a second pre-ranging response message to the second initiator UE indicating the collision with the second ranging signal resources for the second ranging signal.

35. The non-transitory storage medium including program code of clause 34, wherein the program code to determine the collision between the first ranging signal and the second ranging signal comprises program code to determine that the time to broadcast the second ranging signal is within a predetermined amount of time of the time to broadcast the first ranging signal.

36. The non-transitory storage medium including program code of clause 35, wherein the predetermined amount of time is a predetermined maximum wait time for a listen-before-transmit procedure for broadcasting the second ranging signal.

37. The non-transitory storage medium including program code of clause 35, wherein the predetermined amount of time is a predetermined collision threshold time.

38. The non-transitory storage medium including program code of any of clauses 35-37, wherein the program code to determine the collision between the first ranging signal and the second ranging signal comprises program code to determine that the frequencies to broadcast the second ranging signal and the frequencies to broadcast the first ranging signal are the same.

39. The non-transitory storage medium including program code of any of clauses 34-38, further comprising program code to determine an available time to broadcast the second ranging signal, wherein the second pre-ranging response message includes the available time to broadcast the second ranging signal.

40. The non-transitory storage medium including program code of clause 39, wherein the available time to broadcast the second ranging signal is based on the time to broadcast the first ranging signal included in the first ranging signal resources.

41. The non-transitory storage medium including program code of clause 40, wherein the available time to broadcast the second ranging signal is further based on a predetermined maximum wait time for a listen-before-transmit procedure for broadcasting the first ranging signal.

42. The non-transitory storage medium including program code of clause 40, wherein the available time to broadcast the second ranging signal is further based on a predetermined collision threshold time.

43. The non-transitory storage medium including program code of any of clauses 34-42, further comprising program code to receive a third pre-ranging request message from the second initiator UE to initiate the second ranging session, the third pre-ranging request message comprising third ranging signal resources including a time and frequencies for the responder UE to broadcast the second ranging signal in the second ranging session.

44. The non-transitory storage medium including program code of clause 43, further comprising program code to:
perform the first ranging session with the first initiator UE comprising broadcasting the first ranging signal according to the first ranging signal resources; and
perform the second ranging session with the second initiator UE comprising broadcasting the second ranging signal according to the third ranging signal resources.

45. A method of ranging between user equipments (UEs) performed by an initiator UE, the method comprising:
transmitting a first pre-ranging request message to a responder UE to initiate a first ranging session, the first pre-ranging request message comprising first ranging signal resources including a time and frequencies for the responder UE to broadcast a first ranging signal in the first ranging session; and
receiving a first pre-ranging response message from the responder UE indicating a collision between the first ranging signal resources for the first ranging signal and second ranging signal resources for a second ranging signal for a second initiator UE.

46. The method of clause 45, further comprising:
determining an available time for the responder UE to broadcast the first ranging signal; and
transmitting a second pre-ranging request message to the responder UE to initiate the first ranging session, the second pre-ranging request message comprising third ranging signal resources including a time and frequencies for the responder UE to broadcast the first ranging signal in the first ranging session based on the available time.

47. The method of clause 46, wherein the first pre-ranging response message comprises the available time for the responder UE to broadcast the first ranging signal.

48. The method of any of clauses 46-47, wherein the available time for the responder UE to broadcast the first ranging signal is based on the time to broadcast the first ranging signal included in the first ranging signal resources and a predetermined time period.

49. The method of clause 48, wherein the predetermined time period is based on a maximum wait time for a listen-before-transmit procedure for broadcasting the first ranging signal.

50. The method of clause 48, wherein the predetermined time period is a predetermined collision threshold time period.

51. The method of any of clauses 46-50, further comprising:
receiving a second pre-ranging response message from the responder UE acknowledging the second pre-ranging request message; and
performing the first ranging session with responder UE comprising receiving the first ranging signal transmitted by the responder UE according to the third ranging signal resources.

52. The method of clause 45, further comprising performing the first ranging session with responder UE comprising transmitting an initial ranging signal and waiting to receive the first ranging signal transmitted by the responder UE according to the first ranging signal resources.

53. An initiator user equipment (UE) configured for ranging between UEs, the initiator UE, the method comprising:
a wireless transceiver configured to wirelessly communicate with entities in a wireless network;
at least one memory; and
at least one processor coupled to the wireless transceiver and the at least one memory, wherein the at least one processor is configured to:
transmit a first pre-ranging request message to a responder UE to initiate a first ranging session, the first pre-ranging request message comprising first ranging signal resources including a time and frequencies for the responder UE to broadcast a first ranging signal in the first ranging session; and
receive a first pre-ranging response message from the responder UE indicating a collision between the first ranging signal resources for the first ranging signal and second ranging signal resources for a second ranging signal for a second initiator UE.

54. The initiator UE of clause 53, wherein the at least one processor is further configured to:
determine an available time for the responder UE to broadcast the first ranging signal; and
transmit a second pre-ranging request message to the responder UE to initiate the first ranging session, the second pre-ranging request message comprising third ranging signal resources including a time and frequencies for the responder UE to broadcast the first ranging signal in the first ranging session based on the available time.

55. The initiator UE of clause 54, wherein the first pre-ranging response message comprises the available time for the responder UE to broadcast the first ranging signal.

56. The initiator UE of any of clauses 54-55, wherein the available time for the responder UE to broadcast the first ranging signal is based on the time to broadcast the first ranging signal included in the first ranging signal resources and a predetermined time period.

57. The initiator UE of clause 56, wherein the predetermined time period is based on a maximum wait time for a listen-before-transmit procedure for broadcasting the first ranging signal.

58. The initiator UE of clause 56, wherein the predetermined time period is a predetermined collision threshold time period.

59. The initiator UE of any of clauses 54-58, wherein the at least one processor is further configured to:
receive a second pre-ranging response message from the responder UE acknowledging the second pre-ranging request message; and
perform the first ranging session with responder UE comprising receiving the first ranging signal transmitted by the responder UE according to the third ranging signal resources.

60. The initiator UE of clause 53, wherein the at least one processor is further configured to perform the first ranging session with responder UE by being configured to transmit an initial ranging signal and wait to receive the first ranging signal transmitted by the responder UE according to the first ranging signal resources.

61. An initiator user equipment (UE) configured for ranging between UEs, the initiator UE comprising:
means for transmitting a first pre-ranging request message to a responder UE to initiate a first ranging session, the first pre-ranging request message comprising first ranging signal resources including a time and frequencies for the responder UE to broadcast a first ranging signal in the first ranging session; and
means for receiving a first pre-ranging response message from the responder UE indicating a collision between the first ranging signal resources for the first ranging signal and second ranging signal resources for a second ranging signal for a second initiator UE.

62. The initiator UE of clause 61, further comprising:
means for determining an available time for the responder UE to broadcast the first ranging signal; and
means for transmitting a second pre-ranging request message to the responder UE to initiate the first ranging session, the second pre-ranging request message comprising third ranging signal resources including a time and frequencies for the responder UE to broadcast the first ranging signal in the first ranging session based on the available time.

63. The initiator UE of clause 62, wherein the first pre-ranging response message comprises the available time for the responder UE to broadcast the first ranging signal.

64. The initiator UE of any of clauses 62-63, wherein the available time for the responder UE to broadcast the first ranging signal is based on the time to broadcast the first ranging signal included in the first ranging signal resources and a predetermined time period.

65. The initiator UE of clause 64, wherein the predetermined time period is based on a maximum wait time for a listen-before-transmit procedure for broadcasting the first ranging signal.

66. The initiator UE of clause 64, wherein the predetermined time period is a predetermined collision threshold time period.

67. The initiator UE of any of clauses 62-66, further comprising:

means for receiving a second pre-ranging response message from the responder UE acknowledging the second pre-ranging request message; and means for performing the first ranging session with responder UE comprising receiving the first ranging signal transmitted by the responder UE according to the third ranging signal resources.

68. The initiator UE of clause 61, further comprising means for performing the first ranging session with responder UE comprising means for transmitting an initial ranging signal and waiting to receive the first ranging signal transmitted by the responder UE according to the first ranging signal resources.

69. A non-transitory storage medium including program code stored thereon, the program code is operable to configure at least one processor in an initiator user equipment (UE) for ranging between UEs, the initiator UE, the program code comprising instructions to:

transmit a first pre-ranging request message to a responder UE to initiate a first ranging session, the first pre-ranging request message comprising first ranging signal resources including a time and frequencies for the responder UE to broadcast a first ranging signal in the first ranging session; and receive a first pre-ranging response message from the responder UE indicating a collision between the first ranging signal resources for the first ranging signal and second ranging signal resources for a second ranging signal for a second initiator UE.

70. The non-transitory storage medium including program code of clause 69, further comprising program code to:

determine an available time for the responder UE to broadcast the first ranging signal; and transmit a second pre-ranging request message to the responder UE to initiate the first ranging session, the second pre-ranging request message comprising third ranging signal resources including a time and frequencies for the responder UE to broadcast the first ranging signal in the first ranging session based on the available time.

71. The non-transitory storage medium including program code of clause 70, wherein the first pre-ranging response message comprises the available time for the responder UE to broadcast the first ranging signal.

72. The non-transitory storage medium including program code of any of clauses 70-71, wherein the available time for the responder UE to broadcast the first ranging signal is based on the time to broadcast the first ranging signal included in the first ranging signal resources and a predetermined time period.

73. The non-transitory storage medium including program code of clause 72, wherein the predetermined time period is based on a maximum wait time for a listen-before-transmit procedure for broadcasting the first ranging signal.

74. The non-transitory storage medium including program code of clause 72, wherein the predetermined time period is a predetermined collision threshold time period.

75. The non-transitory storage medium including program code of any of clauses 70-74, further comprising program code to:

receive a second pre-ranging response message from the responder UE acknowledging the second pre-ranging request message; and perform the first ranging session with responder UE comprising receiving the first ranging signal transmitted by the responder UE according to the third ranging signal resources.

76. The non-transitory storage medium including program code of clause 70, further comprising program code to perform the first ranging session with responder UE comprising program code to transmit an initial ranging signal and to wait to receive the first ranging signal transmitted by the responder UE according to the first ranging signal resources.

Therefore, it is intended that claimed subject matter not be limited to the particular examples disclosed, but that such claimed subject matter may also include all aspects falling within the scope of appended claims, and equivalents thereof.

What is claimed is:

1. A method of ranging between user equipments (UEs) performed by a responder UE, the method comprising:

receiving a first pre-ranging request message from a first initiator UE to initiate a first ranging session, the first pre-ranging request message comprising first ranging signal resources including a time and frequencies for the responder UE to broadcast a first ranging signal in the first ranging session;

receiving a second pre-ranging request message from a second initiator UE to initiate a second ranging session, the second pre-ranging request message comprising second ranging signal resources including a time and frequencies for the responder UE to broadcast a second ranging signal in the second ranging session;

determining a collision between the first ranging signal and the second ranging signal based on the first ranging signal resources and the second ranging resources;

sending a first pre-ranging response message to the first initiator UE acknowledging the first pre-ranging request message; and sending a second pre-ranging response message to the second initiator UE indicating the collision with the second ranging signal resources for the second ranging signal.

2. The method of claim 1, wherein determining the collision between the first ranging signal and the second ranging signal comprises determining that the time to broadcast the second ranging signal is within a predetermined amount of time of the time to broadcast the first ranging signal.

3. The method of claim 2, wherein the predetermined amount of time is a predetermined maximum wait time for a listen-before-transmit procedure for broadcasting the second ranging signal.

4. The method of claim 2, wherein the predetermined amount of time is a predetermined collision threshold time.

5. The method of claim 2, wherein determining the collision between the first ranging signal and the second ranging signal comprises determining that the frequencies to broadcast the second ranging signal and the frequencies to broadcast the first ranging signal are the same.

6. The method of claim 1, further comprising determining an available time to broadcast the second ranging signal, wherein the second pre-ranging response message includes the available time to broadcast the second ranging signal.

7. The method of claim 6, wherein the available time to broadcast the second ranging signal is based on the time to broadcast the first ranging signal included in the first ranging signal resources.

8. The method of claim 7, wherein the available time to broadcast the second ranging signal is further based on a predetermined maximum wait time for a listen-before-transmit procedure for broadcasting the first ranging signal.

9. The method of claim 7, wherein the available time to broadcast the second ranging signal is further based on a predetermined collision threshold time.

10. The method of claim 1, further comprising receiving a third pre-ranging request message from the second initiator UE to initiate the second ranging session, the third pre-ranging request message comprising third ranging signal resources including a time and frequencies for the responder UE to broadcast the second ranging signal in the second ranging session.

11. The method of claim 10, further comprising:
performing the first ranging session with the first initiator UE comprising broadcasting the first ranging signal according to the first ranging signal resources; and
performing the second ranging session with the second initiator UE comprising broadcasting the second ranging signal according to the third ranging signal resources.

12. A responder user equipment configured for ranging between UEs, the responder UE comprising:
a wireless transceiver configured to wirelessly communicate with entities in a wireless network;
at least one memory; and
at least one processor coupled to the wireless transceiver and the at least one memory, wherein the at least one processor is configured to:
receive a first pre-ranging request message from a first initiator UE to initiate a first ranging session, the first pre-ranging request message comprising first ranging signal resources including a time and frequencies for the responder UE to broadcast a first ranging signal in the first ranging session;
receive a second pre-ranging request message from a second initiator UE to initiate a second ranging session, the second pre-ranging request message comprising second ranging signal resources including a time and frequencies for the responder UE to broadcast a second ranging signal in the second ranging session;
determine a collision between the first ranging signal and the second ranging signal based on the first ranging signal resources and the second ranging resources;
send a first pre-ranging response message to the first initiator UE acknowledging the first pre-ranging request message; and
send a second pre-ranging response message to the second initiator UE indicating the collision with the second ranging signal resources for the second ranging signal.

13. The responder UE of claim 12, wherein the at least one processor is configured to determine the collision between the first ranging signal and the second ranging signal by being configured to determine that the time to broadcast the second ranging signal is within a predetermined amount of time of the time to broadcast the first ranging signal.

14. The responder UE of claim 13, wherein the predetermined amount of time is a predetermined maximum wait time for a listen-before-transmit procedure for broadcasting the second ranging signal.

15. The responder UE of claim 13, wherein the predetermined amount of time is a predetermined collision threshold time.

16. The responder UE of claim 13, wherein the at least one processor is configured to determine the collision between the first ranging signal and the second ranging signal by being configured to determine that the frequencies to broadcast the second ranging signal and the frequencies to broadcast the first ranging signal are the same.

17. The responder UE of claim 12, wherein the at least one processor is further configured to determine an available time to broadcast the second ranging signal, wherein the second pre-ranging response message includes the available time to broadcast the second ranging signal.

18. The responder UE of claim 17, wherein the available time to broadcast the second ranging signal is based on the time to broadcast the first ranging signal included in the first ranging signal resources.

19. The responder UE of claim 18, wherein the available time to broadcast the second ranging signal is further based on a predetermined maximum wait time for a listen-before-transmit procedure for broadcasting the first ranging signal.

20. The responder UE of claim 18, wherein the available time to broadcast the second ranging signal is further based on a predetermined collision threshold time.

21. The responder UE of claim 12, wherein the at least one processor is further configured to receive a third pre-ranging request message from the second initiator UE to initiate the second ranging session, the third pre-ranging request message comprising third ranging signal resources including a time and frequencies for the responder UE to broadcast the second ranging signal in the second ranging session.

22. The responder UE of claim 21, wherein the at least one processor is further configured to:
perform the first ranging session with the first initiator UE by being configured to broadcast the first ranging signal according to the first ranging signal resources; and
perform the second ranging session with the second initiator UE by being configured to broadcast the second ranging signal according to the third ranging signal resources.

23. A responder user equipment configured for ranging between UEs, the responder UE comprising:
means for receiving a first pre-ranging request message from a first initiator UE to initiate a first ranging session, the first pre-ranging request message comprising first ranging signal resources including a time and frequencies for the responder UE to broadcast a first ranging signal in the first ranging session;
means for receiving a second pre-ranging request message from a second initiator UE to initiate a second ranging session, the second pre-ranging request message comprising second ranging signal resources including a time and frequencies for the responder UE to broadcast a second ranging signal in the second ranging session;
means for determining a collision between the first ranging signal and the second ranging signal based on the first ranging signal resources and the second ranging resources;
means for sending a first pre-ranging response message to the first initiator UE acknowledging the first pre-ranging request message; and
means for sending a second pre-ranging response message to the second initiator UE indicating the collision with the second ranging signal resources for the second ranging signal.

24. The responder UE of claim 23, wherein the means for determining the collision between the first ranging signal and the second ranging signal comprises means for determining that the time to broadcast the second ranging signal is within a predetermined amount of time of the time to broadcast the first ranging signal, wherein the predetermined amount of time is a predetermined maximum wait time for a listen-before-transmit procedure for broadcasting the second ranging signal or a predetermined collision threshold time.

25. The responder UE of claim 24, wherein means for determining the collision between the first ranging signal and the second ranging signal comprises means for determining that the frequencies to broadcast the second ranging signal and the frequencies to broadcast the first ranging signal are the same.

26. The responder UE of claim 23, further comprising means for determining an available time to broadcast the second ranging signal, wherein the second pre-ranging response message includes the available time to broadcast the second ranging signal.

27. The responder UE of claim 26, wherein the available time to broadcast the second ranging signal is based on the time to broadcast the first ranging signal included in the first ranging signal resources.

28. The responder UE of claim 27, wherein the available time to broadcast the second ranging signal is further based on a predetermined maximum wait time for a listen-before-transmit procedure for broadcasting the first ranging signal.

29. The responder UE of claim 27, wherein the available time to broadcast the second ranging signal is further based on a predetermined collision threshold time.

30. The responder UE of claim 23, further comprising means for receiving a third pre-ranging request message from the second initiator UE to initiate the second ranging session, the third pre-ranging request message comprising third ranging signal resources including a time and frequencies for the responder UE to broadcast the second ranging signal in the second ranging session.

31. The responder UE of claim 30, further comprising:
   means for performing the first ranging session with the first initiator UE comprising broadcasting the first ranging signal according to the first ranging signal resources; and
   means for performing the second ranging session with the second initiator UE comprising broadcasting the second ranging signal according to the third ranging signal resources.

* * * * *